United States Patent
Medina, III et al.

(10) Patent No.: US 8,358,826 B1
(45) Date of Patent: *Jan. 22, 2013

(54) SYSTEMS AND METHODS FOR RECEIVING AND ORIENTING AN IMAGE OF ONE OR MORE CHECKS

(75) Inventors: Reynaldo Medina, III, San Antonio, TX (US); Matthew Wayne Prater, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1225 days.

This patent is subject to a terminal disclaimer.

(21) Appl. No.: 11/876,925

(22) Filed: Oct. 23, 2007

(51) Int. Cl.
*G06K 9/00* (2006.01)
(52) U.S. Cl. ........................................ 382/137
(58) Field of Classification Search ............ None
See application file for complete search history.

(56) References Cited

U.S. PATENT DOCUMENTS

| | | | |
|---|---|---|---|
| 3,341,820 A | 9/1967 | Grillmeier, Jr. et al. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldston |
| 4,640,413 A | 2/1987 | Kaplan |

(Continued)

FOREIGN PATENT DOCUMENTS

EP 0 984 410 A1 3/2000

OTHER PUBLICATIONS

"Refractive index"; Wikipedia, the free encyclopedia; http://en.wikipedia.org/wiki/Refractive_index, Oct. 16, 2007.

(Continued)

*Primary Examiner* — Bhavesh Mehta
*Assistant Examiner* — Tahmina Ansari
(74) *Attorney, Agent, or Firm* — Nathan O. Greene; Brinks Hofer Gilson and Lione

(57) ABSTRACT

Images of a plurality of checks to be presented for payment may be captured through the use of a check sleeve. The check sleeve includes check-holding mechanism to hold one or more checks in place in the sleeve, and contains various types of markings or other features that allow an image of the sleeve to be oriented, and to allow the portion of the image that represents a check to be distinguished from portions of the image that do not represent a check. One or more algorithms may be used to distinguish check from non-check portions of the image, and to orient the image. The check sleeves may have one or more barcodes imprinted thereon, which may encode various types of information.

21 Claims, 11 Drawing Sheets

U.S. PATENT DOCUMENTS

| | | | |
|---|---|---|---|
| 4,644,144 A | 2/1987 | Chandek | |
| 4,722,444 A | 2/1988 | Murphy | |
| 4,722,544 A | 2/1988 | Weber | |
| 4,727,435 A | 2/1988 | Otani et al. | |
| 4,774,663 A | 9/1988 | Musmanno | |
| 4,790,475 A | 12/1988 | Griffin | |
| 4,806,780 A | 2/1989 | Yamamoto | |
| 4,837,693 A | 6/1989 | Schotz | |
| 4,890,228 A | 12/1989 | Longfield | |
| 4,927,071 A | 5/1990 | Wood | |
| 4,934,587 A | 6/1990 | McNabb | |
| 4,960,981 A | 10/1990 | Benton | |
| 4,975,735 A | 12/1990 | Bright | |
| 5,022,683 A | 6/1991 | Barbour | |
| 5,053,607 A | 10/1991 | Carlson | |
| 5,146,606 A | 9/1992 | Grondalski | |
| 5,157,620 A | 10/1992 | Shaar | |
| 5,159,548 A | 10/1992 | Caslavka | |
| 5,191,525 A | 3/1993 | LeBrun | |
| 5,220,501 A | 6/1993 | Lawlor | |
| 5,227,863 A | 7/1993 | Bilbrey et al. | |
| 5,229,589 A * | 7/1993 | Schneider | 235/456 |
| 5,237,159 A | 8/1993 | Stephens | |
| 5,257,320 A | 10/1993 | Etherington et al. | |
| 5,265,008 A | 11/1993 | Benton | |
| 5,321,816 A | 6/1994 | Rogan | |
| 5,347,302 A | 9/1994 | Simonoff | |
| 5,350,906 A | 9/1994 | Brody | |
| 5,373,550 A | 12/1994 | Campbell | |
| 5,419,588 A | 5/1995 | Wood | |
| 5,422,467 A | 6/1995 | Graef | |
| 5,475,403 A | 12/1995 | Havlovick et al. | |
| 5,504,538 A | 4/1996 | Tsujihara | |
| 5,504,677 A | 4/1996 | Pollin | |
| 5,528,387 A * | 6/1996 | Kelly et al. | 358/488 |
| 5,583,759 A | 12/1996 | Geer | |
| 5,590,196 A | 12/1996 | Moreau | |
| 5,594,225 A | 1/1997 | Botvin | |
| 5,598,969 A | 2/1997 | Ong | |
| 5,602,936 A | 2/1997 | Green | |
| 5,610,726 A | 3/1997 | Nonoshita | |
| 5,611,028 A | 3/1997 | Shibasaki | |
| 5,630,073 A | 5/1997 | Nolan | |
| 5,631,984 A | 5/1997 | Graf et al. | |
| 5,668,897 A | 9/1997 | Stolfo | |
| 5,673,320 A | 9/1997 | Ray | |
| 5,677,955 A | 10/1997 | Doggett | |
| 5,678,046 A | 10/1997 | Cahill et al. | |
| 5,679,938 A | 10/1997 | Templeton | |
| 5,680,611 A | 10/1997 | Rail | |
| 5,691,524 A | 11/1997 | Josephson | |
| 5,699,452 A * | 12/1997 | Vaidyanathan | 382/168 |
| 5,734,747 A * | 3/1998 | Vaidyanathan | 382/170 |
| 5,737,440 A | 4/1998 | Kunkler | |
| 5,748,780 A | 5/1998 | Stolfo | |
| 5,751,842 A | 5/1998 | Riach | |
| 5,784,503 A | 7/1998 | Bleecker, III et al. | |
| 5,830,609 A | 11/1998 | Warner et al. | |
| 5,832,463 A | 11/1998 | Funk | |
| 5,838,814 A | 11/1998 | Moore | |
| 5,863,075 A | 1/1999 | Rich | |
| 5,870,456 A | 2/1999 | Rogers | |
| 5,870,724 A | 2/1999 | Lawlor | |
| 5,870,725 A | 2/1999 | Bellinger et al. | |
| 5,878,337 A | 3/1999 | Joao | |
| 5,893,101 A | 4/1999 | Balogh et al. | |
| 5,897,625 A | 4/1999 | Gustin | |
| 5,901,253 A * | 5/1999 | Tretter | 382/289 |
| 5,903,878 A | 5/1999 | Talati | |
| 5,903,881 A | 5/1999 | Schrader | |
| 5,910,988 A | 6/1999 | Ballard | |
| 5,917,931 A | 6/1999 | Kunkler | |
| 5,924,737 A | 7/1999 | Schrupp | |
| 5,926,548 A | 7/1999 | Okamoto | |
| 5,930,778 A | 7/1999 | Geer | |
| 5,937,396 A | 8/1999 | Konya | |
| 5,940,844 A | 8/1999 | Cahill | |
| 5,982,918 A | 11/1999 | Mennie | |
| 5,987,439 A | 11/1999 | Gustin et al. | |
| 6,012,048 A | 1/2000 | Gustin et al. | |
| 6,014,454 A * | 1/2000 | Kunkler | 382/137 |
| 6,021,202 A | 2/2000 | Anderson | |
| 6,021,397 A | 2/2000 | Jones | |
| 6,029,887 A | 2/2000 | Furuhashi | |
| 6,030,000 A | 2/2000 | Diamond | |
| 6,032,137 A | 2/2000 | Ballard | |
| 6,038,553 A | 3/2000 | Hyde | |
| 6,053,405 A | 4/2000 | Irwin, Jr. et al. | |
| 6,073,119 A | 6/2000 | Bornemisza-wahr | |
| 6,085,168 A | 7/2000 | Mori | |
| 6,097,834 A | 8/2000 | Krouse | |
| 6,097,885 A | 8/2000 | Rayner | |
| 6,105,865 A | 8/2000 | Hardesty | |
| 6,145,738 A | 11/2000 | Stinson et al. | |
| 6,151,426 A | 11/2000 | Lee | |
| 6,159,585 A | 12/2000 | Rittenhouse | |
| 6,170,744 B1 | 1/2001 | Lee | |
| 6,188,506 B1 | 2/2001 | Kaiserman | |
| 6,189,785 B1 | 2/2001 | Lowery | |
| 6,192,165 B1 | 2/2001 | Irons | |
| 6,195,694 B1 | 2/2001 | Chen et al. | |
| 6,199,055 B1 | 3/2001 | Kara | |
| 6,236,009 B1 | 5/2001 | Emigh et al. | |
| 6,243,689 B1 | 6/2001 | Norton | |
| 6,278,983 B1 | 8/2001 | Ball | |
| 6,282,826 B1 | 9/2001 | Richards | |
| 6,293,469 B1 | 9/2001 | Masson et al. | |
| 6,304,860 B1 | 10/2001 | Martin | |
| 6,314,452 B1 | 11/2001 | Dekel | |
| 6,317,727 B1 | 11/2001 | May | |
| 6,328,207 B1 | 12/2001 | Gregoire et al. | |
| 6,330,546 B1 | 12/2001 | Gopinathan et al. | |
| 6,339,658 B1 | 1/2002 | Moccagatta | |
| 6,363,164 B1 | 3/2002 | Jones et al. | |
| 6,390,362 B1 | 5/2002 | Martin | |
| 6,397,196 B1 | 5/2002 | Kravetz | |
| 6,408,084 B1 * | 6/2002 | Foley | 382/101 |
| 6,411,725 B1 | 6/2002 | Rhoads | |
| 6,411,737 B2 | 6/2002 | Wesolkowski et al. | |
| 6,411,938 B1 | 6/2002 | Gates et al. | |
| 6,413,305 B1 | 7/2002 | Mehta | |
| 6,417,869 B1 | 7/2002 | Do | |
| 6,425,017 B1 | 7/2002 | Dievendorff | |
| 6,429,952 B1 | 8/2002 | Olbricht | |
| 6,439,454 B1 | 8/2002 | Masson et al. | |
| 6,449,397 B1 | 9/2002 | Che-chu | |
| 6,450,403 B1 | 9/2002 | Martens et al. | |
| 6,464,134 B1 | 10/2002 | Page | |
| 6,470,325 B1 | 10/2002 | Leemhuis | |
| 6,505,178 B1 | 1/2003 | Flenley | |
| 6,546,119 B2 | 4/2003 | Ciolli et al. | |
| 6,574,609 B1 | 6/2003 | Downs | |
| 6,578,760 B1 | 6/2003 | Otto | |
| 6,587,837 B1 | 7/2003 | Spagna | |
| 6,606,117 B1 | 8/2003 | Windle | |
| 6,609,200 B2 | 8/2003 | Anderson | |
| 6,611,598 B1 | 8/2003 | Hayosh | |
| 6,614,930 B1 | 9/2003 | Agnihotri et al. | |
| 6,643,416 B1 | 11/2003 | Daniels | |
| 6,654,487 B1 | 11/2003 | Downs, Jr. | |
| 6,661,910 B2 | 12/2003 | Jones et al. | |
| 6,672,452 B1 | 1/2004 | Alves | |
| 6,682,452 B2 | 1/2004 | Quintus | |
| 6,695,204 B1 | 2/2004 | Stinson | |
| 6,711,474 B1 | 3/2004 | Treyz et al. | |
| 6,726,097 B2 | 4/2004 | Graef | |
| 6,728,397 B2 | 4/2004 | Mcneal | |
| 6,738,496 B1 | 5/2004 | Van Hall | |
| 6,742,128 B1 | 5/2004 | Joiner | |
| 6,745,186 B1 * | 6/2004 | Testa et al. | 707/737 |
| 6,755,340 B1 | 6/2004 | Voss | |
| 6,763,226 B1 | 7/2004 | McZeal | |
| 6,781,962 B1 | 8/2004 | Williams | |
| 6,786,398 B1 | 9/2004 | Stinson | |
| 6,789,054 B1 | 9/2004 | Makhlouf | |
| 6,796,491 B2 | 9/2004 | Nakajima | |
| 6,806,903 B1 | 10/2004 | Okisu et al. | |

| Patent No. | Date | Inventor |
|---|---|---|
| 6,813,733 B1 | 11/2004 | Li |
| 6,829,704 B2 | 12/2004 | Zhang |
| 6,844,885 B2 | 1/2005 | Anderson |
| 6,856,965 B1 | 2/2005 | Stinson |
| 6,863,214 B2 | 3/2005 | Garner et al. |
| 6,870,947 B2 | 3/2005 | Kelland |
| 6,883,140 B1 | 4/2005 | Acker |
| 6,898,314 B2 | 5/2005 | Kung et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,039,048 B1 | 5/2006 | Monta |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan et al. |
| 7,184,980 B2 | 2/2007 | Allen-Rouman et al. |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones et al. |
| 7,356,505 B2 | 4/2008 | March |
| 7,377,425 B1 | 5/2008 | Ma |
| 7,379,978 B2 | 5/2008 | Anderson |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,421,107 B2 | 9/2008 | Lugg |
| 7,421,410 B1 | 9/2008 | Schechtman et al. |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Statou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,587,066 B2 | 9/2009 | Cordery et al. |
| 7,587,363 B2 | 9/2009 | Cataline |
| 7,590,275 B2 * | 9/2009 | Clarke et al. ............... 382/137 |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,619,721 B2 | 11/2009 | Jones |
| 7,620,231 B2 | 11/2009 | Jones |
| 7,620,604 B1 | 11/2009 | Bueche, Jr. |
| 7,644,043 B2 | 1/2010 | Minowa |
| 7,647,275 B2 | 1/2010 | Jones |
| 7,668,363 B2 | 2/2010 | Price |
| 7,672,940 B2 | 3/2010 | Viola |
| 7,676,409 B1 | 3/2010 | Ahmad |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,734,545 B1 | 6/2010 | Fogliano |
| 7,743,979 B2 | 6/2010 | Fredman |
| 7,753,268 B1 | 7/2010 | Robinson et al. |
| 7,766,244 B1 | 8/2010 | Field |
| 7,769,650 B2 | 8/2010 | Bleunven |
| 7,792,752 B1 | 9/2010 | Kay |
| 7,792,753 B1 | 9/2010 | Slater et al. |
| 7,810,714 B2 | 10/2010 | Murata |
| 7,818,245 B2 | 10/2010 | Prakash et al. |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,896,232 B1 * | 3/2011 | Prasad et al. ............... 235/379 |
| 7,900,822 B1 * | 3/2011 | Prasad et al. ............... 235/379 |
| 7,912,785 B1 | 3/2011 | Kay |
| 7,949,587 B1 | 5/2011 | Morris et al. |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |

| | | |
|---|---|---|
| 7,996,316 B1 | 8/2011 | Smith et al. |
| 8,001,051 B1 | 8/2011 | Smith et al. |
| 8,046,301 B1 | 10/2011 | Smith et al. |
| 2001/0014881 A1 | 8/2001 | Drummond |
| 2001/0018739 A1 | 8/2001 | Anderson |
| 2001/0027994 A1 | 10/2001 | Hayashida |
| 2001/0042171 A1 | 11/2001 | Vermeulen |
| 2001/0042785 A1 | 11/2001 | Walker |
| 2001/0043748 A1 | 11/2001 | Wesolkowski |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta et al. |
| 2002/0171820 A1 | 11/2002 | Okamura |
| 2002/0178112 A1 | 11/2002 | Goeller |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0051753 A1 | 3/2005 | Hayashi et al. |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097046 A1 | 5/2005 | Singfield |
| 2005/0108164 A1 | 5/2005 | Salafia |
| 2005/0108168 A1 | 5/2005 | Halpin |
| 2005/0115110 A1 | 6/2005 | Dinkins |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Anderson |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |
| 2005/0289182 A1* | 12/2005 | Pandian et al. ............ 707/104.1 |

| Publication No. | Date | Name | Ref |
|---|---|---|---|
| 2006/0002426 A1 | 1/2006 | Madour | |
| 2006/0004660 A1 | 1/2006 | Pranger | |
| 2006/0025697 A1 | 2/2006 | Kurzweil | |
| 2006/0039628 A1* | 2/2006 | Li et al. | 382/289 |
| 2006/0039629 A1 | 2/2006 | Li | |
| 2006/0041506 A1 | 2/2006 | Mason et al. | |
| 2006/0045321 A1* | 3/2006 | Yu | 382/137 |
| 2006/0047593 A1 | 3/2006 | Naratil | |
| 2006/0053056 A1 | 3/2006 | Alspach-Goss | |
| 2006/0059085 A1 | 3/2006 | Tucker | |
| 2006/0064368 A1 | 3/2006 | Forte | |
| 2006/0080245 A1 | 4/2006 | Bahl | |
| 2006/0085357 A1 | 4/2006 | Pizarro | |
| 2006/0102704 A1* | 5/2006 | Reynders et al. | 229/68.1 |
| 2006/0106691 A1 | 5/2006 | Sheaffer | |
| 2006/0106717 A1 | 5/2006 | Randle | |
| 2006/0110063 A1 | 5/2006 | Weiss | |
| 2006/0112013 A1 | 5/2006 | Maloney | |
| 2006/0115110 A1 | 6/2006 | Rodriguez | |
| 2006/0115141 A1 | 6/2006 | Koakutsu et al. | |
| 2006/0118613 A1 | 6/2006 | McMann | |
| 2006/0144924 A1 | 7/2006 | Stover | |
| 2006/0144950 A1 | 7/2006 | Johnson | |
| 2006/0161501 A1 | 7/2006 | Waserstein | |
| 2006/0164682 A1* | 7/2006 | Lev | 358/1.15 |
| 2006/0167818 A1 | 7/2006 | Wentker et al. | |
| 2006/0182331 A1 | 8/2006 | Gilson et al. | |
| 2006/0182332 A1 | 8/2006 | Weber | |
| 2006/0206506 A1 | 9/2006 | Fitzpatrick | |
| 2006/0210138 A1 | 9/2006 | Hilton et al. | |
| 2006/0214940 A1 | 9/2006 | Kinoshita | |
| 2006/0215204 A1 | 9/2006 | Miyamoto et al. | |
| 2006/0215230 A1 | 9/2006 | Borrey et al. | |
| 2006/0222260 A1 | 10/2006 | Sambongi et al. | |
| 2006/0229976 A1 | 10/2006 | Jung | |
| 2006/0229986 A1 | 10/2006 | Corder | |
| 2006/0238503 A1 | 10/2006 | Smith | |
| 2006/0242062 A1 | 10/2006 | Peterson | |
| 2006/0242063 A1 | 10/2006 | Peterson | |
| 2006/0249567 A1 | 11/2006 | Byrne | |
| 2006/0274164 A1 | 12/2006 | Kimura et al. | |
| 2006/0279628 A1 | 12/2006 | Fleming | |
| 2006/0282383 A1 | 12/2006 | Doran | |
| 2006/0291744 A1 | 12/2006 | Ikeda et al. | |
| 2007/0016796 A1 | 1/2007 | Singhal | |
| 2007/0019243 A1 | 1/2007 | Sato | |
| 2007/0022053 A1 | 1/2007 | Waserstein | |
| 2007/0027802 A1 | 2/2007 | VanDeburg et al. | |
| 2007/0031022 A1 | 2/2007 | Frew | |
| 2007/0038561 A1 | 2/2007 | Vancini et al. | |
| 2007/0041629 A1 | 2/2007 | Prakash et al. | |
| 2007/0050292 A1 | 3/2007 | Yarbrough | |
| 2007/0053574 A1 | 3/2007 | Verma et al. | |
| 2007/0058851 A1 | 3/2007 | Quine | |
| 2007/0063016 A1 | 3/2007 | Myatt | |
| 2007/0064991 A1 | 3/2007 | Douglas et al. | |
| 2007/0065143 A1 | 3/2007 | Didow et al. | |
| 2007/0075772 A1 | 4/2007 | Kokubo | |
| 2007/0076940 A1 | 4/2007 | Goodall et al. | |
| 2007/0076941 A1 | 4/2007 | Carreon et al. | |
| 2007/0077921 A1 | 4/2007 | Hayashi | |
| 2007/0080207 A1 | 4/2007 | Williams | |
| 2007/0082700 A1 | 4/2007 | Landschaft | |
| 2007/0084911 A1 | 4/2007 | Crowell | |
| 2007/0086642 A1 | 4/2007 | Foth | |
| 2007/0086643 A1 | 4/2007 | Spier | |
| 2007/0094088 A1 | 4/2007 | Mastie | |
| 2007/0100748 A1 | 5/2007 | Dheer | |
| 2007/0110277 A1* | 5/2007 | Hayduchok et al. | 382/101 |
| 2007/0118472 A1 | 5/2007 | Allen-Rouman et al. | |
| 2007/0122024 A1 | 5/2007 | Haas et al. | |
| 2007/0127805 A1* | 6/2007 | Foth et al. | 382/137 |
| 2007/0129955 A1 | 6/2007 | Dalmia | |
| 2007/0136198 A1 | 6/2007 | Foth et al. | |
| 2007/0140545 A1 | 6/2007 | Rossignoli | |
| 2007/0140594 A1 | 6/2007 | Franklin | |
| 2007/0143208 A1 | 6/2007 | Varga | |
| 2007/0150337 A1 | 6/2007 | Hawkins et al. | |
| 2007/0156438 A1* | 7/2007 | Popadic et al. | 705/1 |
| 2007/0168265 A1 | 7/2007 | Rosenberger | |
| 2007/0171288 A1 | 7/2007 | Inoue | |
| 2007/0172107 A1* | 7/2007 | Jones et al. | 382/137 |
| 2007/0172148 A1* | 7/2007 | Hawley | 382/281 |
| 2007/0179883 A1 | 8/2007 | Questembert | |
| 2007/0183000 A1 | 8/2007 | Eisen et al. | |
| 2007/0194102 A1 | 8/2007 | Cohen | |
| 2007/0198432 A1 | 8/2007 | Pitroda et al. | |
| 2007/0203708 A1 | 8/2007 | Polcyn et al. | |
| 2007/0208816 A1 | 9/2007 | Baldwin et al. | |
| 2007/0235518 A1 | 10/2007 | Mueller et al. | |
| 2007/0235520 A1 | 10/2007 | Smith et al. | |
| 2007/0241179 A1 | 10/2007 | Davis | |
| 2007/0244782 A1 | 10/2007 | Chimento | |
| 2007/0246525 A1 | 10/2007 | Smith et al. | |
| 2007/0251992 A1 | 11/2007 | Sharma et al. | |
| 2007/0255652 A1 | 11/2007 | Tumminaro | |
| 2007/0255653 A1 | 11/2007 | Tumminaro | |
| 2007/0255662 A1 | 11/2007 | Tumminaro | |
| 2007/0258634 A1 | 11/2007 | Simonoff | |
| 2007/0271182 A1 | 11/2007 | Prakash et al. | |
| 2007/0278286 A1 | 12/2007 | Crowell et al. | |
| 2007/0288380 A1 | 12/2007 | Starrs | |
| 2007/0288382 A1 | 12/2007 | Narayanan et al. | |
| 2007/0295803 A1 | 12/2007 | Levine et al. | |
| 2008/0002911 A1 | 1/2008 | Eisen | |
| 2008/0021802 A1 | 1/2008 | Pendleton | |
| 2008/0040280 A1 | 2/2008 | Davis et al. | |
| 2008/0052182 A1 | 2/2008 | Marshall | |
| 2008/0059376 A1 | 3/2008 | Davis | |
| 2008/0063253 A1 | 3/2008 | Wood | |
| 2008/0068674 A1* | 3/2008 | McIntyre | 358/474 |
| 2008/0071721 A1 | 3/2008 | Wang | |
| 2008/0080760 A1 | 4/2008 | Ronca | |
| 2008/0086420 A1 | 4/2008 | Gilder et al. | |
| 2008/0086421 A1 | 4/2008 | Gilder | |
| 2008/0091599 A1 | 4/2008 | Foss, Jr. | |
| 2008/0097899 A1 | 4/2008 | Jackson et al. | |
| 2008/0103790 A1 | 5/2008 | Abernethy | |
| 2008/0103967 A1 | 5/2008 | Ackert et al. | |
| 2008/0113674 A1 | 5/2008 | Baig | |
| 2008/0114739 A1 | 5/2008 | Hayes | |
| 2008/0117991 A1 | 5/2008 | Peddireddy | |
| 2008/0119178 A1 | 5/2008 | Peddireddy | |
| 2008/0133411 A1 | 6/2008 | Jones et al. | |
| 2008/0147549 A1 | 6/2008 | Ruthbun | |
| 2008/0156438 A1 | 7/2008 | Stumphauzer et al. | |
| 2008/0162350 A1 | 7/2008 | Allen-Rouman et al. | |
| 2008/0162371 A1 | 7/2008 | Rampell et al. | |
| 2008/0177659 A1 | 7/2008 | Lacey et al. | |
| 2008/0180750 A1 | 7/2008 | Feldman | |
| 2008/0208727 A1 | 8/2008 | McLaughlin et al. | |
| 2008/0214180 A1 | 9/2008 | Cunningham et al. | |
| 2008/0219543 A1 | 9/2008 | Csulits | |
| 2008/0245869 A1 | 10/2008 | Berkun et al. | |
| 2008/0247629 A1 | 10/2008 | Gilder | |
| 2008/0247655 A1 | 10/2008 | Yano | |
| 2008/0249931 A1 | 10/2008 | Gilder | |
| 2008/0249951 A1 | 10/2008 | Gilder et al. | |
| 2008/0262953 A1 | 10/2008 | Anderson | |
| 2008/0275821 A1 | 11/2008 | Bishop et al. | |
| 2008/0316542 A1 | 12/2008 | Mindrum et al. | |
| 2009/0024520 A1 | 1/2009 | Drory et al. | |
| 2009/0046938 A1* | 2/2009 | Yoder | 382/242 |
| 2009/0060396 A1 | 3/2009 | Blessan et al. | |
| 2009/0108080 A1 | 4/2009 | Meyer | |
| 2009/0110281 A1 | 4/2009 | Hirabayashi | |
| 2009/0141962 A1 | 6/2009 | Borgia et al. | |
| 2009/0171819 A1 | 7/2009 | Emde et al. | |
| 2009/0171825 A1 | 7/2009 | Roman | |
| 2009/0173781 A1 | 7/2009 | Ramachandran | |
| 2009/0190823 A1* | 7/2009 | Walters | 382/137 |
| 2009/0192938 A1 | 7/2009 | Amos | |
| 2009/0236413 A1 | 9/2009 | Mueller et al. | |
| 2009/0252437 A1 | 10/2009 | Li | |
| 2009/0281904 A1 | 11/2009 | Pharris | |
| 2009/0313167 A1 | 12/2009 | Dujari | |
| 2010/0007899 A1 | 1/2010 | Lay | |
| 2010/0027679 A1 | 2/2010 | Sunahara et al. | |

| | | | |
|---|---|---|---|
| 2010/0047000 A1* | 2/2010 | Park et al. | 399/394 |
| 2010/0057578 A1 | 3/2010 | Blair et al. | |
| 2010/0061446 A1 | 3/2010 | Hands et al. | |
| 2010/0082470 A1 | 4/2010 | Walach | |
| 2010/0165015 A1* | 7/2010 | Barkley et al. | 347/1 |
| 2010/0260408 A1 | 10/2010 | Prakash et al. | |
| 2010/0262522 A1 | 10/2010 | Anderson et al. | |
| 2010/0312705 A1 | 12/2010 | Caruso et al. | |
| 2011/0112967 A1 | 5/2011 | Anderson et al. | |

OTHER PUBLICATIONS

Palacios, Rafael, Sinha, Anshu and Gupta, Amar; "Automatic Processing of Brazilian Bank Checks"; Machine Vision and Applications; 2002; pp. 1-28.

Kornai, Andras, Mohiuddin, K.M. and Connell, Scott D. Connell, "Recognition of Cursive Writing on Personal Checks," Proceedings of the International Workshop on the Frontiers in Handwriting Recognition, Sep. 1996; pp. 1-6.

Gupta, Amar, Magendraprasad, M.V., Liu, A.,Wang, Patrick and Ayyadurai, S.; "An Integrated Architecture for Recognition of Totally Unconstrained Handwritten Numerals"; International Journal of Pattern Recognition and Artificial Intelligence; 1993; pp. 757-773; vol. 7, No. 4.

Dinan, R. F. Dinan, Painter, L. D. and Rodite, R. R.; "ImagePlus High Performance Transaction System"; IBM Systems Journal; 1990; pp. 421-434; vol. 29, No. 3.

"Accept "Customer Not Present" Checks," Accept Check Online, http://checksoftware.com.

"Adjusting Brightness and Contrast", www.eaglesoftware.com/adjustin.htm, retrieved on May 4, 2009 (4 pgs).

"Best practices for producing quality digital image files," Digital Images Guidelines, http://deepblue.lib.umich.edu/bitstream/2027.42/40247/1/Images-Best_Practice.pdf, downloaded 2007 (2 pgs).

"Chapter 7 Payroll Programs," Uniform Staff Payroll System, http://www2.oecn.k12.oh.us/www/ssdt/usps/usps_user_guide_005.html.

"Check 21—The check is not in the post", RedTitan Technology 2004 http://www.redtitan.com/check21/htm (3 pgs).

"Check 21 Solutions," Columbia Financial International, Inc. http://www.columbiafinancial.us/check21/solutions.htm.

"Check Fraud: A Guide to Avoiding Losses", All Net, http://all.net/books/audit/checkfraud/security.htm.

"Compliance with Regulation CC", http./www/federalreserve.gov/Pubs/regcc/regcc.htm, Jan. 24, 2006 (6 pgs).

"Customer Personalized Bank Checks and Address Labels" Checks Your Way Inc., http://www.checksyourway.com/htm/web_pages/faq.htm.

"Direct Deposit Application for Payroll", Purdue University, Business Office Form 0003, http://purdue.edu/payroll/pdf/directdepositapplication.pdf, Jul. 2007 (2 pgs).

"Direct Deposit Authorization Form", www.umass.edu/humres/library/DDForm.pdf, May 2003 (3 pgs).

"Direct Deposit," University of Washington, http://www.washington.edu/admin/payroll/directdeposit.html.

"Electronic Billing Problem: The E-check is in the mail" American Banker—vol. 168, No. 95, May 19, 2003 (4 pgs).

"Frequently Asked Questions" Bank of America, http://www/bankofamerica.com/deposits/checksave/index.cfm?template-lc_faq_bymail.

"Full Service Direct Deposit", www.nonprofitstaffing.com/images/upload/dirdepform.pdf.

"How to Digitally Deposit a Check Image", Smart Money Daily, Copyright 2008 (5 pgs).

"ImageNet Mobile Deposit Provides Convenient Check Deposit and Bill Pay to Mobile Consumers," Miteksystems, 2008 (2 pgs).

"It's the easiest way to Switch banks", LNB, http://www.inbky.com/pdf/LNBswitch-kit10-07.pdf.

"Lesson 38—More Bank Transactions", Turtle Soft, http://www.turtlesoft.com/goldenseal-software-manual.lesson38.htm.

"Middleware", David E. Bakken, Encyclopedia of Distributed Computing, Kluwer Academic Press, 2001 (6 pgs).

"Mitek Systems Announces Mobile Deposit Application for Apple iPhone," http://prnewswire.com/cgi-bin/stories/pl?ACCT=104&STORY=/www/story/10-01-. . . , Nov. 25, 2008 (2 pgs).

"Personal Finance", PNC, http://www.pnc.com/webapp/unsec/productsandservice.do?sitearea=/PNC/home/personal/account+services/quick+switch/quick+switch+faqs.

"Remote Deposit Capture", Plante & Moran, http://plantemoran.com/industries/fincial/institutions/bank/resources/community+bank+advisor/2007+summer+issue/remote+deposit+capture.htm.

"Remote Deposit" National City, http://www.nationalcity.com/smallbusiness/cashmanagement/remotedeposit/default.asp.

"Save on ATM Fees", RedEye Edition, Chicago Tribune, Chicago, IL Jun. 30, 2007 (2 pgs).

"Switching Made Easy," Bank of North Georgia, http://www.banknorthgeorgia.com/cmsmaster/documents/286/documents616.pdf, 2007 (7 pgs).

"Two Words Every Business Should Know: Remote Deposit," Canon, http://www.rpsolutions.com/rpweb/pdfs/canon_rdc.pdf, 2005 (7 pgs).

"Virtual Bank Checks", Morebusiness.com, http://www.morebusiness.com/running_yourbusiness/businessbits/d908484987.brc.

"WallStreetGrapevine.com" Stocks on the Rise: JADG, BKYI, MITK; Mar. 3, 2008 (4 pgs).

"What is check Fraud", National Check Fraud Center, http://www.ckfraud.org/ckfraud.html.

Affinity Federal Credit Union, "Affinity Announces Online Deposit," Aug. 4, 2005 (1 pg).

Albrecht, W. Steve, "Check Kiting: Detection, Prosecution and Prevention," The FBI Law Enforcement Bulletin, Nov. 1, 1993 (6 pgs).

Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).

Amber Avalona-Butler/Paraglide, "At Your Service: Best iPhone Apps for Military Lifestyle," Jul. 9, 2010 (2 pgs).

Anderson, Milton M. "FSML and Echeck", Financial Services Technology Consortium, 1999 (17 pgs).

Archive Index Systems; Panini My Vision X-30 or VX30 or X30 © 1994-2008 Archive Systems, Inc. P./O. Box 40135 Bellevue, WA USA 98015 (2 pgs).

Associate of German Banks, SEPA 2008: Uniform Payment Instruments for Europe, Berlin, Bundesverbankd deutscher banker ev (42 pgs).

Automated Merchant Systems, Inc., "Electronic Check Conversion," http://www.automatedmerchant.com/electronic_check_conversion.cfm, 2006, downloaded Oct. 18, 2006 (3 pgs).

Bank Systems & Technology, Untitled Article, May 1, 2006, http://www.banktech.com/showarticle.jhtml? articleID=187003126, "Are you Winning in the Payment World?" (4 pgs).

BankServ, "DepositNow: What's the difference?".

BankServ, Product Overview, http://www.bankserv.com/products/remotedeposit.htm.

Blafora, Bonnie "Lower Commissions, Fewer Amenities", Better Investing, Madison Heights: Feb. 2003, vol. 52, Iss 6, (4 pgs).

BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).

Blue Mountain Consulting, from URL: www.bluemontainconsulting.com.

Board of Governors of the federal reserve system, "Report to the Congress on the Check Clearing for the 21$^{st}$ Century Act of 2003" Apr. 2007, Submitted to Congress pursuant to section 16 of the Check Clearing for the 21$^{st}$ Century Act of 2003, (59 pgs).

Bruene, Jim; "Check Free to Enable In-Home Remote Check Deposit for Consumers and Small Business", NetBanker. Com, Financial Insite, Inc., http://www.netbanker.com/2008/02/checkfree_to_enableinhome_rem.html, Feb. 5, 2008 (3 pgs).

Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).

Bruno, M., "Instant Messaging," Bank Technology News, Dec. 2002 (3 pgs).

Burnett, J. "Depository Bank Endorsement Requirements," BankersOnline.com, http://www.bankersonline.com/cgi-bin/printview/printview.pl, Jan. 6, 2003 (3 pgs).

Canon, ImageFormula CR-25/CR-55, "Improve Your Bottom Line with Front-Line Efficiencies", 0117W117, 1207-55/25-1 OM-BSP.

Carrubba, P. et al., "Remote Deposit Capture: A White Paper Addressing Regulatory, Operational and Risk Issues," NetDeposit Inc., 2006 (11 pgs).

Century Remote Deposit High-Speed Scanner User's Manual Release 2006, (Century Manual), Century Bank, 2006, (32 pgs).

Chiang, Chuck, The Bulletin, "Remote banking offered", http://bendbulletin.com/apps/pbcs.dll/article?AID=/20060201/BIZ0102/602010327&templ . . . , May 23, 2008 (2 pgs).

CNN.com/technology, "Scan, deposit checks from home", www.cnn.com/2008ITECH/biztech/02/07/check.scanning.ap/index.html, Feb. 7, 2008 (3 pgs).

Constanzo, Chris, "Remote Check Deposit: Wells Captures A New Checking Twist", Bank Technology News Article—May 2005, www.americanbankercom/btn_article.html?id=20050502YQ50FSYG (2 pgs).

Craig, Ben, "Resisting Electronic Payment Systems: Burning Down the House?", Federal Reserve Bank of Cleveland, Jul. 1999 (4 pgs).

Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).

Credit Union Journal, "The Ramifications of Remote Deposit Capture Success", www.cujournal.com/orintthis.html?id=20080411EODZT57G, Apr. 14, 2008 (1 pg).

Credit Union Journal, "AFCU Averaging 80 DepositHome Transactions Per Day", Credit Union Journal, Aug. 15, 2005 (1 pg).

DCU Members Monthly—Jan. 2008, "PC Deposit—Deposit Checks from Home!", http://www.mycreditunionnewsletter.com/dcu/0108/page1.html, Copyright 2008 Digital Federal Credit Union (2 pgs).

De Jesus, A. et al., "Distributed Check Processing in a Check 21 Environment: An educational overview of the opportunities and challenges associated with implementing distributed check imaging and processing solutions," Panini, 2004, pp. 1-22.

De Queiroz, Ricardo et al., "Mixed Raster Content (MRC) Model for Compound Image Compression", 1998 (14 pgs).

Debello, James et al., "RDM and Mitek Systems to Provide Mobile Check Deposit," Mitek Systems, Inc., San Diego, California and Waterloo, Ontario, (Feb. 24, 2009), 2 pgs.

DeYoung, Robert; "The Financial Performance of Pure Play Internet Banks"; Federal Reserve Bank of Chicago Economic Perspectives; 2001; pp. 60-75; vol. 25, No. 1 (16pgs).

Dias, Danilo et al., "A Model for the Electronic Representation of Bank Checks", Brasilia Univ. Oct. 2006 (5 pgs).

Digital Transactions News, "An ACH-Image Proposal For Check Roils Banks and Networks" May 26, 2006 (3 pgs).

eCU Technologies, "Upost Remote Deposit Solution," Retrieved from the internet https://www.eutechnologies.com/products/upost.html, downloaded 2009 (1 pg).

EFT Network Unveils FAXTellerPlus, EFT Network, Inc., www.eftnetwork.com, Jan. 13, 2009 (2 pgs).

ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).

Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html.

Federal Reserve Board, "Check Clearing for the 21st Century Act", FRB, http://www.federalreserve.gov/paymentsystems/truncation/, Mar. 1, 2006 (1 pg).

Federal Reserve System, "12 CFR, Part 229 : Availability of Funds and Collection of Checks," Federal Registrar, Apr. 28, 1997, pp. 1-50.

Federal Reserve System, "Part IV, 12 CFR Part 229 : Availability of Funds and Collection of Checks; Final Rule," Federal Registrar, vol. 69, No. 149, Aug. 4, 2004, pp. 47290-47328.

Fest, Glen., "Patently Unaware" Bank Technology News, Apr. 2006, Retrieved from the internet at URL:http://banktechnews.com/article.html?id=2006403T7612618 (5 pgs).

Fidelity Information Services, "Strategic Vision Embraces Major Changes in Financial Services Solutions: Fidelity's long-term product strategy ushers in new era of application design and processing," Insight, 2004, pp. 1-14.

Fisher, Dan M., "Home Banking in the 21st Century: Remote Capture Has Gone Retail", May 2008 (4 pgs).

Furst, Karen et al., "Internet Banking: Developments and Prospects", Economic and Policy Analysis Working Paper 2000-9, Sep. 2000 (60 pgs).

Garry, M., "Checking Options: Retailers face an evolving landscape for electronic check processing that will require them to choose among several scenarios," Supermarket News, vol. 53, No. 49, 2005 (3 pgs).

German Shegalov, Diplom-Informatiker, "Integrated Data, Message, and Process Recovery for Failure Masking in Web Services", Dissertation Jul. 2005 (146 pgs).

Gupta, Maya R. et al., "OCR binarization and image pre-processing for searching historical documents," Pattern Recognition, vol. 40, No. 2, Feb. 2007, pp. 389-397.

Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).

Hartly, Thomas, "Banks Check Out New Image", Business First, Buffalo: Jul. 19, 2004, vol. 20, Issue 43, (3 pgs).

Heckenberg, D. "Using Mac OS X for Real-Time Image Processing" Oct. 8, 2003 (15 pgs).

Hildebrand, C. et al., "Electronic Money," Oracle, http://www.oracle.com/oramag/profit/05-feb/p15financial.html, 2005, downloaded Oct. 18, 2006 (5 pgs).

Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).

Image Master, "Photo Restoration: We specialize in digital photo restoration and photograph repair of family pictures", http://www.imphotorepair.com, Cited in patent No. 7,900,822, as downloaded Apr. 2007 (1 pg).

Investment Systems Company, "Portfolio Accounting System," 2000, pp. 1-32.

JBC, "What is a MICR Line?," eHow.com, retrieved from http://www.ehow.com/about_4684793_what-micr-line.html on May 4, 2009 (2 pgs).

Johnson, Jennifer J., Secretary of the Board; Federal Reserve System, 12 CFR Part 229, Regulation CC, "Availability of Funds and Collection of Checks".

Kendrick, Kevin B., "Check Kiting, Float for Purposes of Profit," Bank Security & Fraud Prevention, vol. 1, No. 2, 1994 (3 pgs).

Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).

Knestout, Brian P. et al., "Banking Made Easy" Kiplinger's Personal Finance Washington, Jul. 2003, vol. 57, Iss 7 (5 pgs).

Levitin, Adam J., Remote Deposit Capture: A Legal and Transactional Overview, Banking Law Journal, p. 115, 2009 (RDC).

Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).

Matthews, Deborah, "Advanced Technology Makes Remote Deposit Capture Less Risky," Indiana Bankers Association, Apr. 2008 (2 pgs).

Metro 1 Credit Union, "Remote Banking Services," hltp://ww\\i.metro1cu.org/metro1cu/remote.html, downloaded Apr. 17, 2007 (4 pgs).

Mitek systems, "Imagenet Mobile Deposit", San Diego, CA, downloaded 2009 (2 pgs).

Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/mi qa3799/is200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm.
Oxley, Michael G., from committee on Financial Services; "Check Clearing for the $21^{st}$ Century Act", $108^{th}$ Congress, $1^{st}$ Session House of Representatives report 108-132, Jun. 2003 (20 pgs).
Oxley, Michael G., from the committee of conference; "Check Clearing for the $21^{st}$ Century Act" $108^{th}$ Congress, $1^{st}$ Session Senate report 108-291, Oct. 1, 2003 (27 pgs).
Patterson, Scott "USAA Deposit@Home—Another WOW moment for Net Banking", NextCU.com, Jan. 26, 2007 (5 pgs).
Public Law 108-100, 108 Congress; "An Act Check Clearing for the $21^{st}$ Century Act", Oct. 28, 2003, 117 STAT. 1177 (18 pgs).
Rao, Bharat; "The Internet and the Revolution in Distribution: A Cross-Industry Examination"; Technology in Society; 1999; pp. 287-306; vol. 21, No. 3 (20 pgs).
Remotedepositcapture, URL:www.remotedepositcapture.com.
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankServ Announces New Remote Deposit Product Integrated with QuickBooks" (3 pgs).
Remotedepsitcapture.com, LLC, "Remote Deposit Capture Overview," ROC Overview, http://remotedepositcapture.com/overview/RDC_overview.htm.
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).
Rose, Sarah et al., "Best of the We: The Top 50 Financial Websites", Money, New York, Dec. 1999, vol. 28, Iss. 12 (8 pgs).
Shelby, Hon. Richard C. (Committee on Banking, Housing and Urban Affairs); "Check Truncation Act of 2003", calendar No. 168, $108^{th}$ Congress, $1^{st}$ Session Senate report 108-79, Jun. 2003 (27 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html (2 pgs).
The Automated Clearinghouse, "Retail Payment Systems; Payment Instruments Clearing and Settlement: The Automated Clearinghouse (ACH)", www.ffiec.gov/ffiecinfobase/booklets/retailretail_02d.html.
The Green Sheet 2.0: Newswire, "CO-OP adds home deposit capabilities to suite of check imaging products", www.greensheet.com/newswire.php?newswire_id=8799, Mar. 5, 2008 (2 pgs).
Tygar, J.D., Atomicity in Electronic Commerce, In ACM Networker, 2:2, Apr./May 1998 (12 pgs).
Valentine, Lisa, "Remote Deposit Capture Hot Just Got Hotter," ABA Banking Journal, Mar. 2006, p. 1-9.
Wade, Will, "Early Notes: Updating Consumers on Check 21" American Banker Aug. 10, 2004 (3 pgs).
Wallison, Peter J., "Wal-Mart Case Exposes Flaws in Banking-Commerce Split", American Banker, vol. 167. No. 8, Jan. 11, 2002 (3 pgs).
Wells Fargo 2005 News Releases, "The New Wells Fargo Electronic Deposit Services Break Through Banking Boundaries In The Age of Check 21", San Francisco Mar. 28, 2005, www.wellsfargo.com/press/3282005_check21Year=2005 (1 pg).
Wells Fargo Commercial, "Remote Deposit", www.wellsfargo.com/com/treasury mgmtlreceivables/electronic/remote deposit, Copyright 2008 (1 pg).
White, J.M. et al., "Image Thresholding for Optical Character Recognition and Other Applications Requiring Character Image Extraction", IBM J. Res. Development, Jul. 1983, vol. 27, No. 4 (12 pgs).
Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia ®, "Remote Deposit," http://en.wikipedia.org/wiki/Remote_deposit, 2007 (3 pgs).
Windowsfordevices.com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, New York, N.Y.: Feb. 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A. 1.
Zhang, C.Y., "Robust Estimation and Image Combining" Astronomical Data Analysis Software and Systems IV, ASP Conference Series, 1995 (5 pgs).
Zions Bancorporation, "Moneytech, the technology of money in our world: Remote Deposit," http://www.bankjunior.com/pground/moneytech/remote_deposit.jsp, 2007 (2 pgs).
Application as filed on Apr. 3, 2008 for U.S. Appl. No. 12/062,143 (27 pgs).
Application as filed on Aug. 19, 2010 for U.S. Appl. No. 12/859,741 (235 pgs).
Application as filed on Aug. 21, 2008 for U.S. Appl. No. 12/195,723 (38 pgs).
Application as filed on Aug. 21, 2009 for U.S. Appl. No. 12/545,127 (45 pgs).
Application as filed on Aug. 28, 2009 for U.S. Appl. No. 12/549,443 (41 pgs).
Application as filed on Dec. 20, 2006 for U.S. Appl. No. 11/613,656 (21 pgs).
Application as filed on Dec. 30, 2010 for U.S. Appl. No. 12/982,494 (280 pgs).
Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Dec. 30, 2010 for U.S. Appl. No. 12/982,594 (275 pgs).
Application as filed on Feb. 18, 2009 for U.S. Appl. No. 12/388,005 (37 pgs).
Application as filed on Jul. 13, 2006 for U.S. Appl. No. 11/487,537 (23 pgs).
Application as filed on Jul. 27, 2009 for U.S. Appl. No. 12/509,613 (48 pgs).
Application as filed on Jul. 27, 2009 for U.S. Appl. No. 12/509,680 (41 pgs).
Application as filed on Jun. 11, 2008 for U.S. Appl. No. 12/137,051 (29 pgs).

Application as filed on Jun. 8, 2011 for U.S. Appl. No. 13/155,976 (352 pgs).
Application as filed on Jun. 8, 2011 for U.S. Appl. No. 13/156,007 (356 pgs).
Application as filed on Jun. 8, 2011 for U.S. Appl. No. 13/156,018 (353 pgs).
Application as filed on Mar. 15, 2007 for U.S. Appl. No. 11/686,924 (34 pgs).
Application as filed on Mar. 15, 2007 for U.S. Appl. No. 11/686,928 (36 pgs).
Application as filed on Mar. 4, 2009 for U.S. Appl. No. 12/397,671 (40 pgs).
Application as filed on Mar. 4, 2009 for U.S. Appl. No. 12/397,930 (37 pgs).
Application as filed on May 10, 2007 for U.S. Appl. No. 11/747,222 (35 pgs).
Application as filed on Oct. 17, 2008 for U.S. Appl. No. 12/253,278 (42 pgs).
Application as filed on Oct. 23, 2007 for U.S. Appl. No. 11/876,925 (36 pgs).
Application as filed on Oct. 23, 2007 for U.S. Appl. No. 11/877,335 (29 pgs).
Application as filed on Oct. 25, 2007 for U.S. Appl. No. 11/923,839 (22 pgs).
Application as filed on Oct. 29, 2007 for U.S. Appl. No. 11/926,388 (23 pgs).
Application as filed on Oct. 30, 2007 for U.S. Appl. No. 11/928,297 (26 pgs).
Application as filed on Oct. 31, 2006 for U.S. Appl. No. 11/590,974 (31 pgs).
Application as filed on Oct. 31, 2006 for U.S. Appl. No. 11/591,008 (27 pgs).
Application as filed on Oct. 31, 2006 for U.S. Appl. No. 11/591,227 (58 pgs).
Application as filed on Oct. 31, 2006 for U.S. Appl. No. 11/591,273 (56 pgs).
Application as filed on Oct. 31, 2007 for U.S. Appl. No. 11/930,537 (27 pgs).
Application as filed on Oct. 31, 2007 for U.S. Appl. No. 11/931,670 (47 pgs).
Application as filed on Oct. 8, 2007 for U.S. Appl. No. 11/868,884 (30 pgs).
Application as filed on Sep. 28, 2007 for U.S. Appln No. 11/864,569 (35 pgs).
Application as filed on Sep. 8, 2008 for U.S. Appl. No. 12/205,996 (30 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Aug. 19, 2010 for U.S. Appl. No. 12/859,752 (5 pgs).
Claims as filed on Dec. 15, 2011 for U.S. Appl. No. 13/327,478 (4 pgs).
Claims as filed on Dec. 20, 2006 for U.S. Appl. No. 11/613,671 (3 pgs).
Claims as filed on Dec. 8, 2010 for U.S. Appl. No. 12/963,513 (7 pgs).
Claims as filed on Feb. 16, 2011 for U.S. Appl. No. 13/028,477 (3 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Claims as filed on Mar. 15, 2007 for U.S. Appl. No. 11/686,925 (5 pgs).
Claims as filed on May 10, 2007 for U.S. Appl. No. 11/747,223 (4 pgs).
Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Office Action from corresponding U.S. Appl. No. 11/876,889 dated Feb. 22, 2010 (12 pages).
Office Action from corresponding U.S. Appl. No. 11/876,931 dated Jun. 7, 2011 (75 pages).

* cited by examiner

SYSTEMS AND METHODS FOR RECEIVING AND ORIENTING AN IMAGE OF ONE OR MORE CHECKS

CROSS-REFERENCE TO RELATED APPLICATIONS

This application is related by subject matter to the inventions disclosed in the following commonly assigned applications, the entirety of which are hereby incorporated by reference herein: U.S. patent application Ser. No. 11/876,889, and U.S. patent application Ser. No. 11/876,931, each filed on Oct. 23, 2007, and each entitled "Systems, methods, and apparatus for receiving images of one or more checks".

BACKGROUND

When a check is to be deposited in an account, it has generally been the case that the original physical paper check is presented for payment through a banking system. However, technological and legal developments (e.g., the Check-21 law) have made it possible to present an image of a check for payment in place of the physical paper check. With the availability of this mode of presentment, one issue that arises is how to capture images of the checks to be presented.

It is possible to capture an image of a check with ordinary image capture technology, such as a scanner or digital camera. When such an image is captured, there are typically portions of the image that represent part of a check, and excess portions of the image that do not represent part of the check. A process may be employed to determine which portions of the image represent the check(s) contained in the image.

SUMMARY

A check sleeve, with space to hold one or more checks, may be used to capture an image of a check. The checks sleeve may, for example, be made of a flexible material, such as plastic, and may have mechanisms to hold one or more checks in place in one or more designated spaces. For example, the check sleeve may have a flap or corners that hold a check in place during scanning. The type of flap or corners that are used may be chosen to hold the check in place, while also allowing certain parts of the image to be captured without optical interference—e.g., by having cutouts that directly expose the check in portions that are expected to undergo optical character recognition. The mechanism may also be configured to allow optical detection of the presence or absence of a check within the sleeve.

Markings or other features may be incorporated into the check sleeve to assist in orienting an image of the check to the proper angle, or in distinguishing portions of the image that represent the check from non-check portions. For example, horizontal and vertical lines may be printed on the check whose position on an image can be detected allow the skew angle of the image to be determined and offset. Also, the background of the sleeve may be printed in a color or opacity that is expected to contrast with the checks that are to be placed in the sleeve, thereby providing contrast that can be used to distinguish check portions of the image from non-check portions. Additionally, one or more barcodes can be printed on the sleeve that can encode information such as the type of sleeve, the account number to which the checks are to be deposited, or a digital signature.

A sleeve can be constructed that holds a plurality of checks—e.g., two or three checks—thereby allowing plural checks to be scanned at the same time. However, a sleeve that holds a single check can also be constructed.

DETAILED DESCRIPTION

Image of checks to be presented for payment can be obtained with ordinary scanning equipment, such as a scanner or digital camera. When such an image is to be obtained, a check sleeve can be used to assist in the image capture. The sleeve can have markings that help to identify the boundary of the check within the image, to orient the check image to the proper angle, or to assist in obtaining images of plural checks in a single capture. When an image is captured in this matter, algorithms can be used to distinguish the portions of an image that represent the check from the non-check portions, or to orient the image. Examples of such sleeves and algorithms are described herein.

Figure 1:
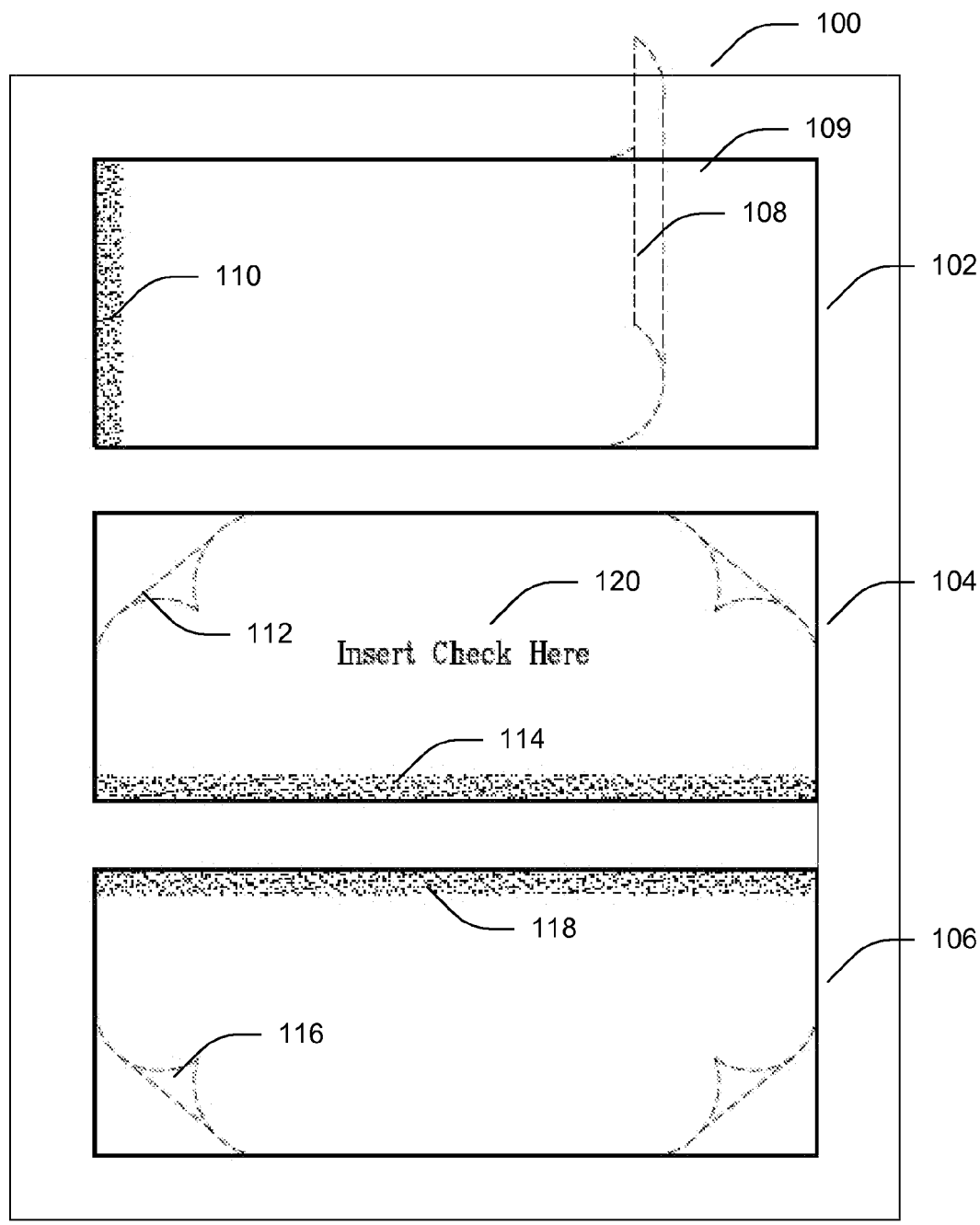
FIGS. 1-3 are plan views of check sleeves demonstrating various example check-holding mechanisms.
Figure 2:
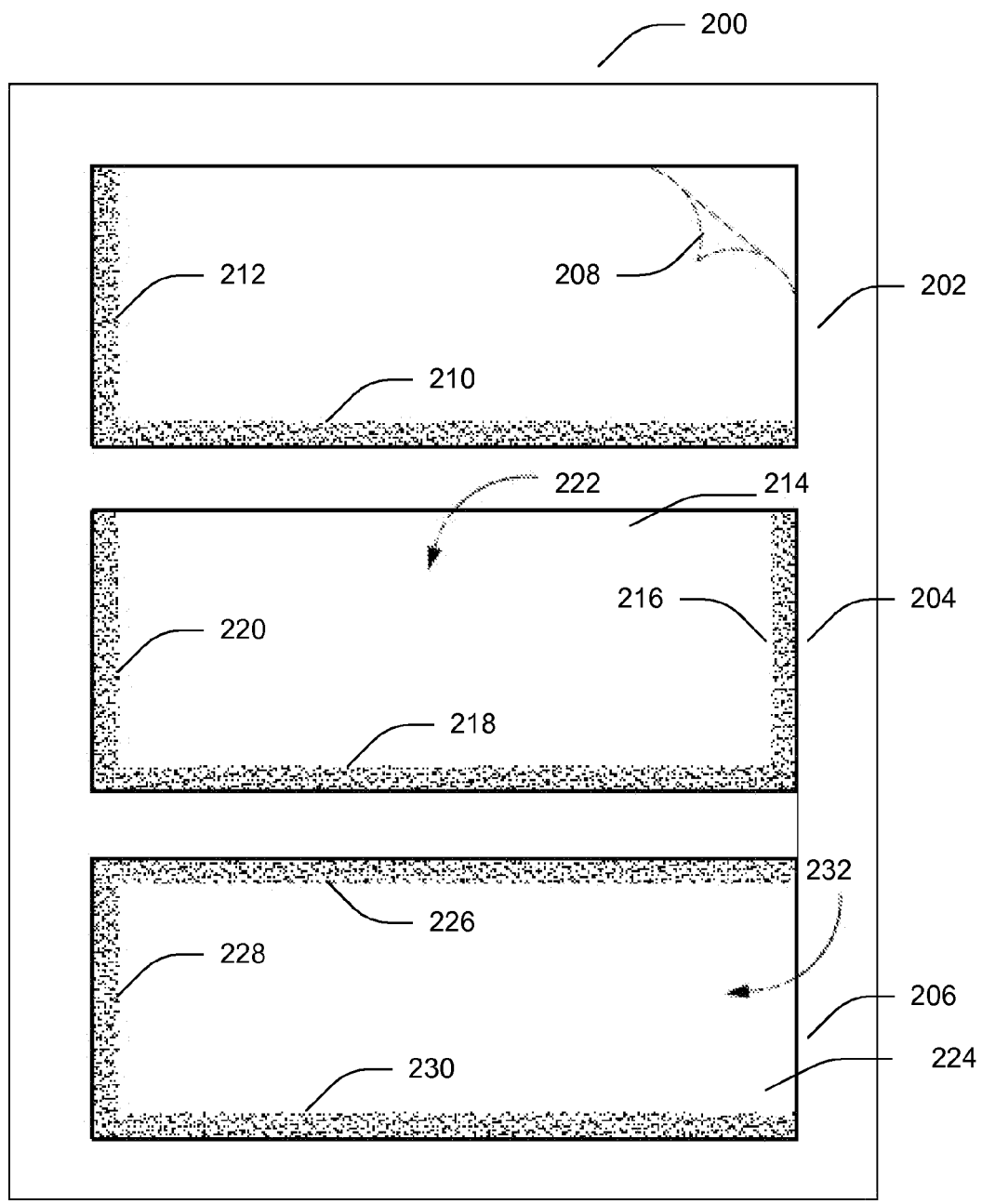
Figure 3:
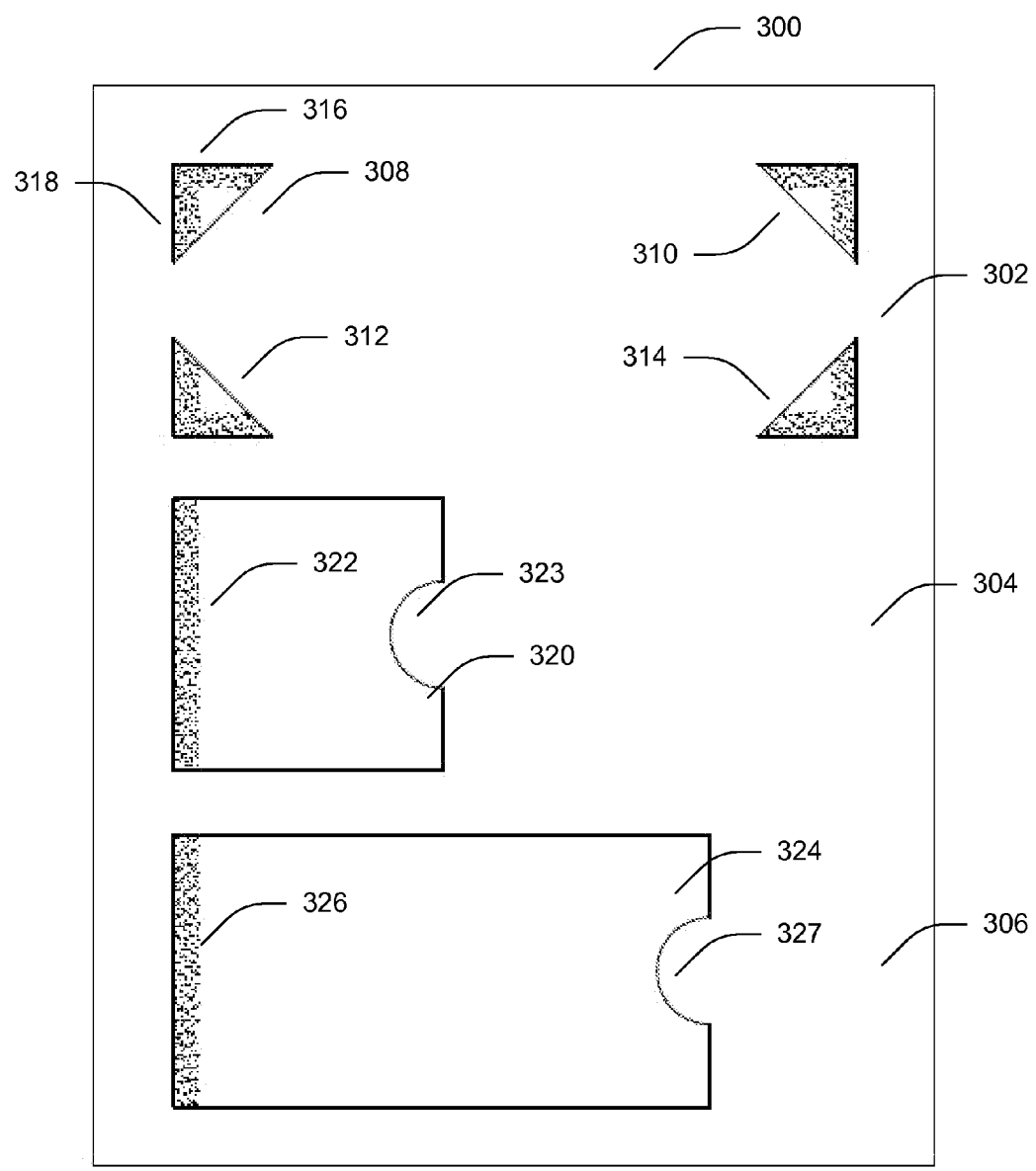

A sleeve to hold one or more checks in place for scanning can be constructed. For example, such a sleeve could be constructed out of a plastic sheet, and the sheet could have one or more mechanisms to hold checks in place. FIGS. 1-3 show example designs of sleeves. In order to show various designs, each of the sleeves shown in FIGS. 1-3 shows three different designs of the mechanism to hold a check in place. However, a production version of the sleeve may have one design replicated in a plurality of places on the sheet. Moreover, the sleeves shown in FIGS. 1-3 show mechanisms to hold three checks in place, which may be appropriate for checks that have the size of a "personal" check. However, a sleeve could be constructed using similar design to hold larger (e.g., business) checks in place. Such a sleeve might have space for two checks instead of three, and might use a landscape orientation of the checks instead of the portrait orientation shown in FIGS. 1-3.

Turning to the drawings, FIG. 1 shows an example of a check sleeve. The sleeve depicted in FIG. 1 comprises a sheet of any type of material (e.g., plastic), and has spaces 102, 104, and 106 to hold three checks in place. In space 102, a flap 108 is attached to cover the area 109 into which a check may be inserted. Flap 108 is attached along a single edge 110. (Throughout FIGS. 1-3, the stipple pattern along an edge indicates that two components are attached along the edge. Flap 108 and sheet 100 are examples of two components whose attachment can be depicted in such a manner.) A check can be inserted between sheet 100 and flap 108. Sheet 100 and flap 108 may be made of a material chosen to keep a check in place through the resistive force of friction or electrostatic interaction. Plastic is an example of a material that may provide the requisite resistive force to hold the check in place.

In space 104, a flap 112 is attached to cover the area into which a check may be inserted. Flap 112 is attached along bottom edge 114. In space 106, a flap 116 is attached along top edge 118.

Each of the flaps 108, 112, and 116 shown in FIG. 1 is attached along a single edge. However, the different positions of the attachment may have different attributes as to their ability to hold a check in place, likelihood that the process of placing the check in a scanner bed will dislodge the check, and user convenience, and thus each placement of the flap represents a different design of the check-holding mechanism. As noted above, a production version of sheet 100 may have three spaces 102, 104, and 106, each with the same check-holding mechanism—e.g., each of the three spaces could have a flap attached along a short side, as does flap 108. However, in order to demonstrate the different mechanism compactly, in the figures three different mechanisms are demonstrated on one sheet.

FIG. 1 depicts a sleeve as shown from the back—that is, if checks were inserted into sleeve 100, the back of the check would be visible in the view shown in FIG. 1. (FIGS. 2 and 3 likewise depict the backs of sleeves.) Most of the information on a check is contained on the front and not the back. Thus, to the extent that a check-holding mechanism involves flaps, corners, etc. that are attached to the sheet, these flaps, corners, etc. can be attached to the back of the sheet to prevent these items from interfering with capturing the image on the front of the check. This method of attaching the flaps, corners, etc., may result in capturing a smoother, less flawed image of the front of the check. However, the flaps, corners, etc., may be attached to the sheet in any manner, and on either side of the sheet.

An image or words may be attached to a flap. For example, flap 112 has the words "Insert Check Here" written on the flap. This image may be used as part of a process of detecting whether a check is present in a particular space. For example, if the words "Insert Check Here" are visible when the front of sheet 100 is scanned, this fact may indicate that no check is present in space 104, a check that is placed between sheet 100 and flap 212 would obscure those words when sheet 100 is viewed from the front. Any type of image or words may be written on a flap to facilitate this type of detection.

FIG. 2 shows another example of a check sleeve. The sleeve shown in FIG. 2 comprises sheet 200. Like sheet 100 (shown in FIG. 1), sheet 200 may be made of any type of material, such as plastic. Sheet 200 has spaces 202, 204, and 206 to hold checks in place. FIG. 2 shows three types of mechanisms for holding checks in place in each of the spaces 202, 204, and 206. In space 202, there is a flap 208, which is affixed to sheet 200 along edges 210 and 212. In space 204, flap 214 is affixed to sheet 200 along three edges 216, 218, and 220. A check is insertable between flap 214 and sheet 200 through the opening indicated by arrow 222, where the opening is along the edge of flap 214 that is not affixed to sheet 200. In space 206, flap 224 is affixed to sheet 200 along three edges 226, 228, and 230. A check is insertable between flap 224 and sheet 200 through the opening indicated by arrow 232, where the opening is along the edge of flap 224 that is not affixed to sheet 200. The opening between flap 214 and sheet 200 is along the top of flap 214, while the opening between flap 224 and sheet 200 is along the side of flap 224. These different positions of the openings represent different designs of a check-holding mechanism.

FIG. 3 shows another example of a check sleeve. The check sleeve shown in FIG. 3 comprises a sheet 300. Sheet 300 has three spaces 302, 304, and 306 to hold checks in place. FIG. 3 shows three types of mechanisms for holding checks in spaces 302, 304, and 306. In space 302, corners 308, 310, 312, and 314 are each affixed to sheet 300. Each of corners 308, 310, 312, and 304 may be formed of a material, such as plastic, and may be affixed to sheet 300 at each of its edges. For example, corner 308 is affixed to sheet 300 along its edges 316 and 318, and corners 310, 312, and 314 are affixed to sheet 300 similarly. In the example of FIG. 3, four corners are shown to hold a check in place, although one, two, or three corners could also be used.

In space 304, there is a flap 320, which is affixed to sheet 300 along edge 322. Flap 320 has a notch 323, and is not as long as the length of a personal check that would be held in place in space 304. Similarly, in space 306, flap 324 is affixed to sheet 300 along edge 326. Flap 324 has a notch 327. The notches 323 and 327 may assist the user of sheet 300 in handling the flaps to insert the check. Additionally, to the extent that the back of a check would be placed along flaps 320 and/or 324, the fact that flaps 320 and 324 do not extend all the way across the check may help to obtain a clear image of the endorsement on the back of the check. When a check is inserted between flaps 320 or 324 and sheet 300, it would be inserted with the endorsement toward what is depicted as the right-hand side of FIG. 3, so the flaps 320 and 324, due to their length as being less than the length of a check, would not cover the endorsement, and therefore would not introduce optical interference in scanning the endorsement. However, flaps 320 and 324 can be of any length.

Figure 4:
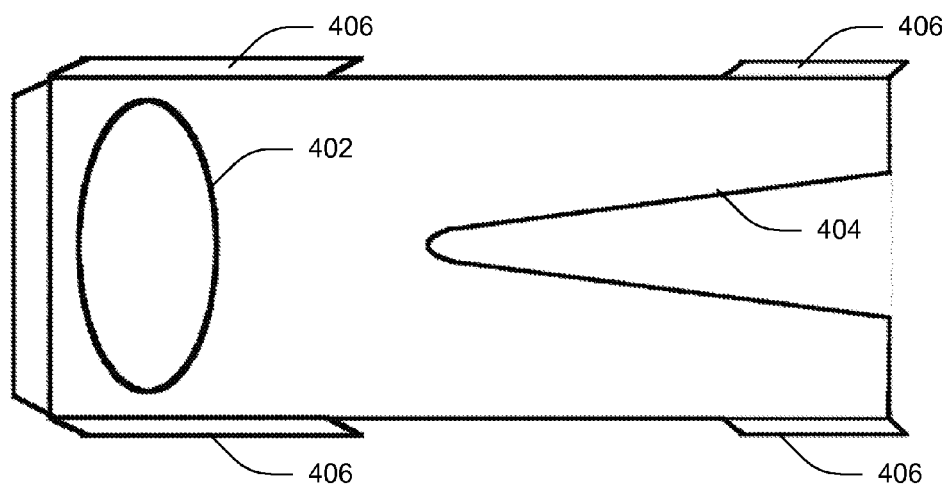
FIG. 4 is a perspective view of an example flap to hold a check in a check sleeve.

In addition to the check-holding mechanisms depicted in FIGS. 1-3, other variations on the mechanisms are possible. For example, FIG. 4 shows an example variation on the design of a flap. Flap 400 has a cutout 402 and a notch 404. Cutout 402 is shown as an ellipse, but could be any shape. Notch 404 is shown as extending slightly more than halfway across the flap, but could be of any length. Cutout 402 can be positioned in the place where a check endorsement is expected to be located when a check is placed in a sleeve that employs flap 400. To the extent that the material of which flap 400 is made (e.g., plastic) may have certain reflective and/or luminescent properties, these properties may result in a bright "orb" when the image is scanned with certain types of lighting equipment, and this bright "orb" may interfere with scanning and detecting the endorsement. Leaving the area for the endorsement exposed through cutout 402 may avoid this type of lighting distortion. Tabs 406 are components that can be melted during production of a sleeve to bind flap 400 to a sheet (such as the sheets 100, 200, and 300 shown in FIGS. 1-3). In the example shown in FIG. 4, tabs 406 are positioned such that, if all were melted and used to affix flap 400 to a sheet, the flap would not be retractable to insert the check. In this case, notch 404 could be used by a person to slightly pull back the flap in order to insert the check between flap 400 and a sheet. However, flap 400 could also be attached in such a way as to make it retractable (e.g., by using fewer than all of tabs 406), in which case flap 400 could be retracted by the user to allow the check to be inserted between the flap and a sheet.

Figure 5:
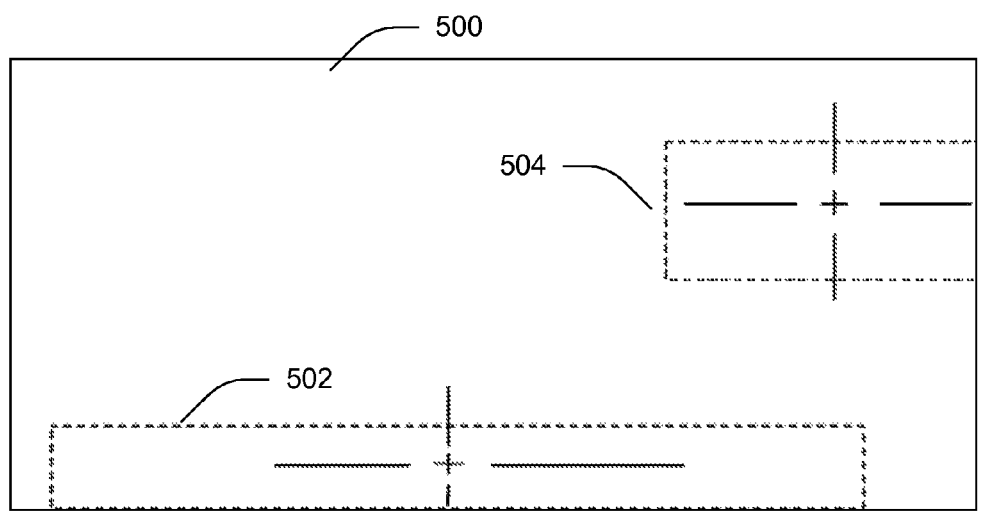
FIG. 5 is a plan view of an example space on a sheet through which the front of a check may be visible.

To the extent that a bright "orb" can interfere with capturing an image, this problem can occur on the front of the check as well as the back. FIG. 5 shows an example of a sheet design that can be used to address this issue on the front of a check. Area 500 is an area of a sheet. As previously described, when a check is inserted into a sleeve, the front of the check is normally visible through the front of the sleeve. In FIG. 5, the area in which a check is to be inserted has cutouts 502 and 504. Cutout 502 is where the Magnetic Ink Character Recognition ("MICR") line of the check is expected to appear when the check is inserted, and cutout 504 is where the numerical amount for which the check is drawn is expected to be written. These areas may be larger than the expected areas of the MICR line and the check amount, in order to account for variations in how the check is placed in the sleeve.

Figure 6:
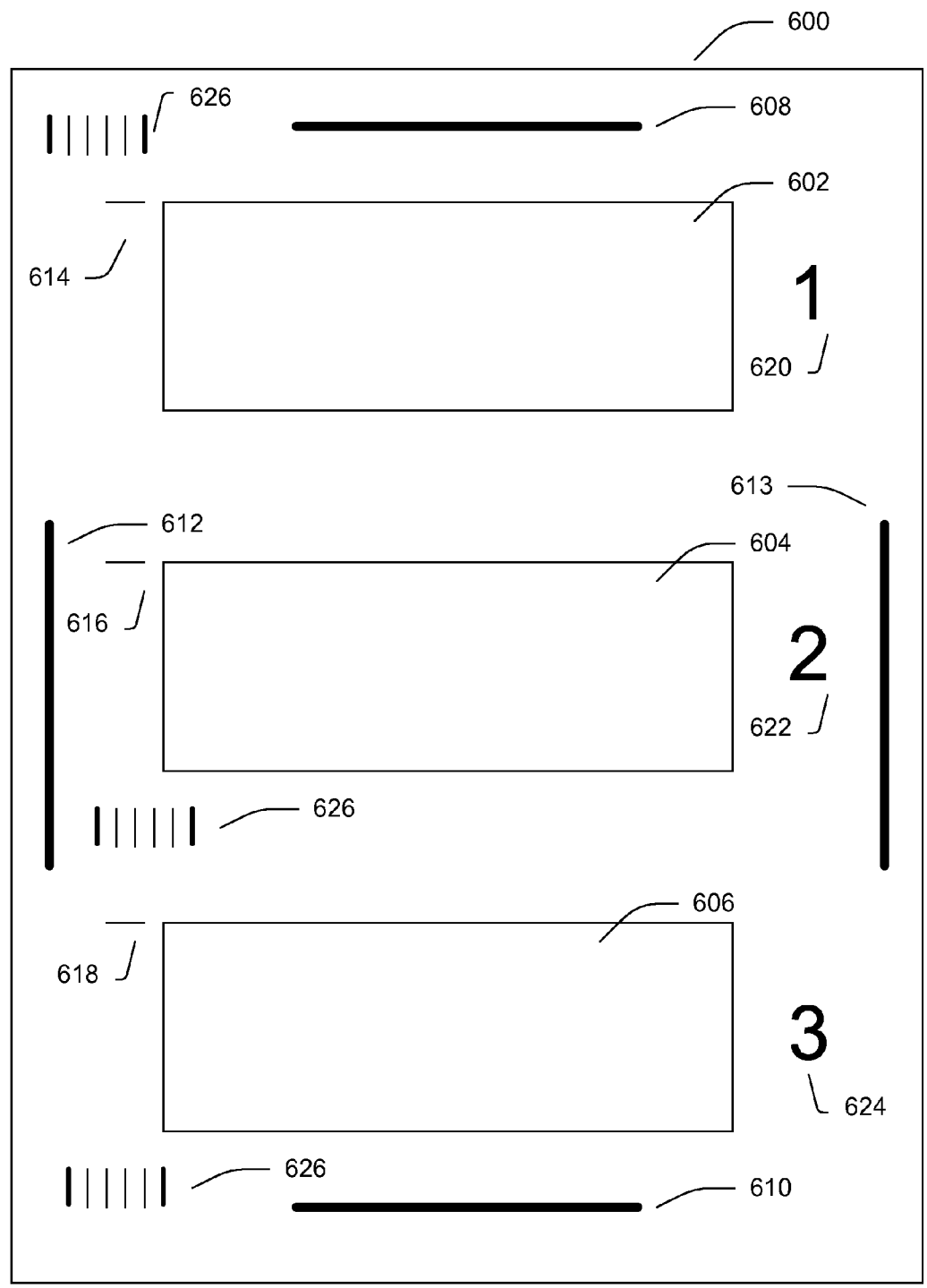
FIG. 6 is a plan view of a first example check sleeve design.
Figure 7:
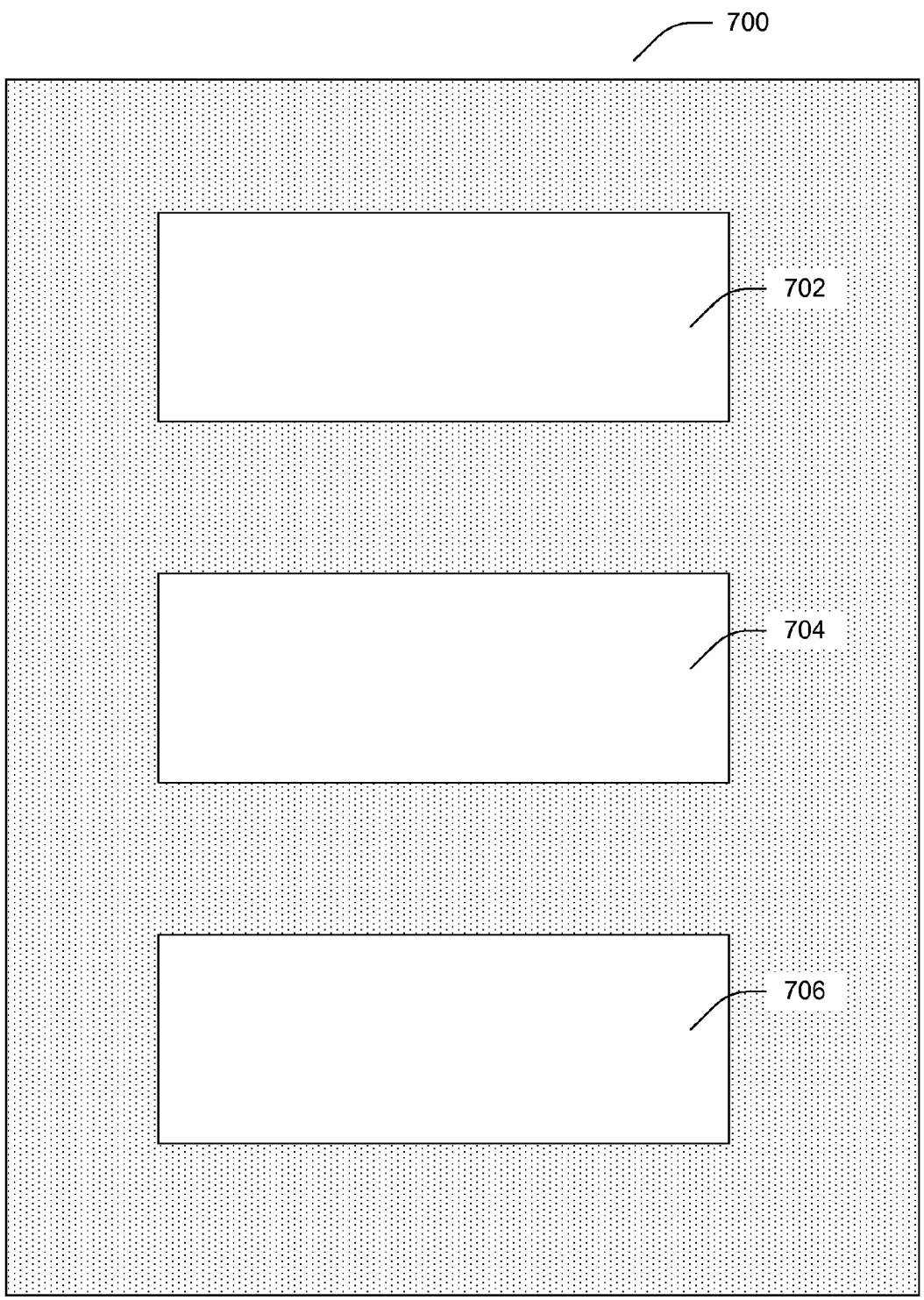
FIG. 7 is a plan view of a second example check sleeve design.
Figure 8:
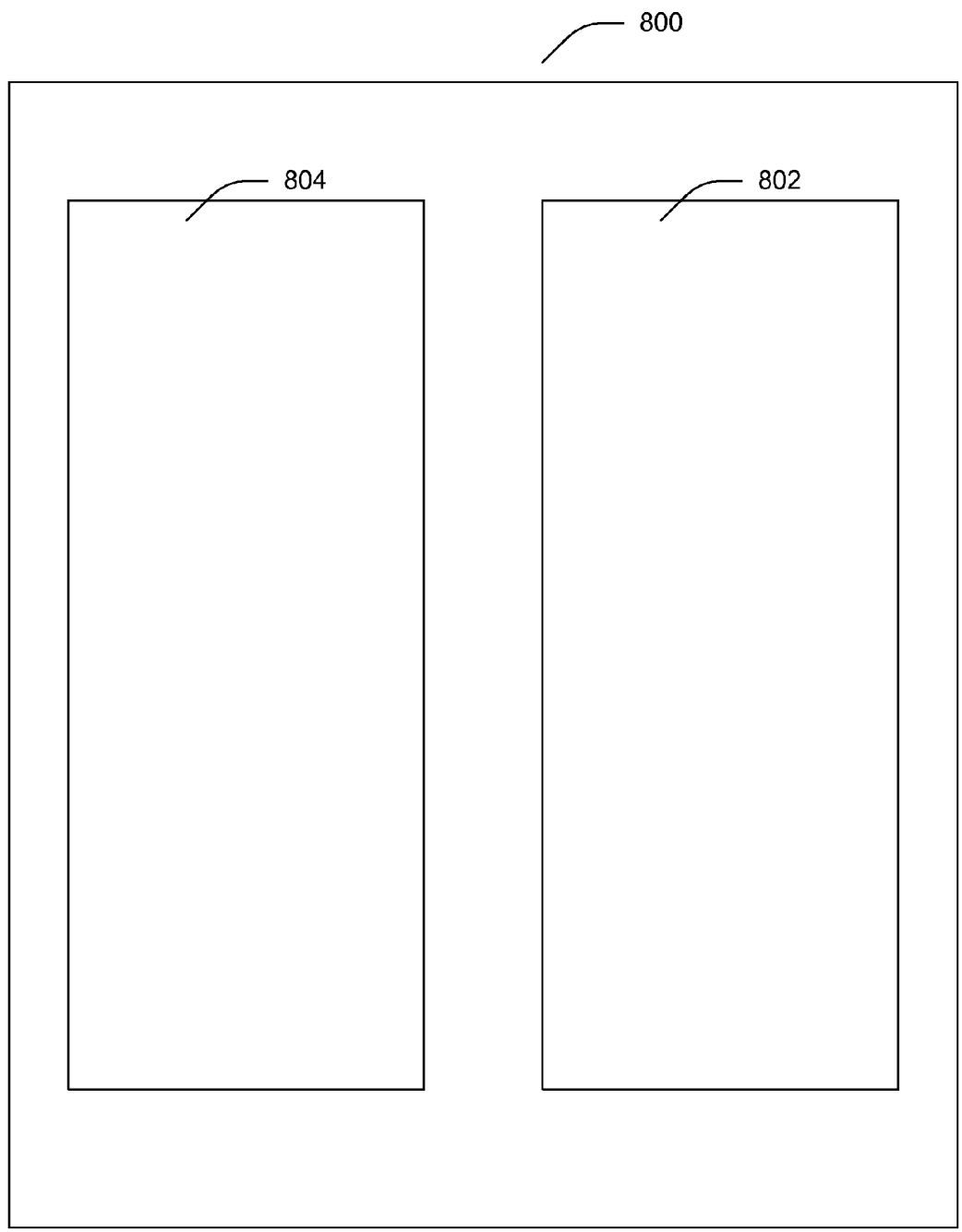
FIG. 8 is a plan view of an example check sleeve design that can be used with checks that are sized differently from personal checks.

Turning now to other aspects of a check sleeve, FIGS. 6-8 are views of various sleeves. Each of FIGS. 6-8 shows various features that may be used in a sleeve. However, the features shown can be used in any combination or sub-combination. Although each of the sleeves in FIGS. 6-8 depicts, by way of example, a certain combination of features, a sleeve could employ all of the features shown, none of the features shown, some of the features shown, and/or other features.

In FIG. 6, sleeve 600 has areas 602, 604, and 606 where checks may be placed. These areas may employ some of the mechanisms previously discussed to hold a check in place in one of those areas. Sleeve 600 has horizontal line markings 608 and 610, and vertical line markings 612 and 613. Sleeve 600 also has horizontal line markings 614, 616, and 618. Markings 614, 616, and 618 may be of a relative thickness and length that is less than that of markings 608, 610, and 612. However, any line thickness may be used, and markings may have any dimensions (thickness, length, etc.) relative to each other. In the example shown in FIG. 6, there are two thick horizontal line markings, one thick vertical line marking, and three thin horizontal line markings. However, any number of line markings can be used. The various line markings may be with an algorithm to detect the orientation and position of the sleeve, and of the checks contained in the sleeve. However, markings may be used for any reason, and orientation and position of a sleeve and of checks can also be detected using other mechanisms. Additionally, in one example the markings may have non-symmetrical features—e.g., the thin horizontal line markings 614, 616 and 618 may appear on one side of the sleeve—which may help an image processing mechanism to determine whether the view of the sleeve that is being scanned is the front or back of the sleeve.

Sleeve 600, in the example of FIG. 6, also has sequence numbers 620, 622, and 624. These numbers may assist a user in determining the order in which to place checks in the sleeve. The numbers may also be optically recognizable, and may assist an image processing mechanism to identify a particular check when the sleeve and checks are scanned. For example, a user could prompt the user to enter the amount of check number "1" (or "2", or "3"). Numbers 620, 622, and 624 would then guide the user as to which check to place in which portion of the sleeve. Moreover, when the image of the checks in the sleeve is processed, character recognition techniques could scan for numerals 620, 622, and 624, and for the checks next to those numerals, so that the images of checks can be matched with the amounts entered by the user.

Sleeve 600 may also have a barcode 626 imprinted thereon. As another example, there could be multiple barcodes 626— e.g., one barcode next to each area into which a check may be inserted. Barcode 626 could encode any type of information. For example, barcode 626 could be a code that enables a given financial institution to recognize its own sleeve, and verify that the customer is using a sleeve provided by that particular financial institution as opposed to a sleeve provided by a different financial institution. As another example, a financial institution may provide various different sleeves (e.g., sleeves for different sized checks, sleeves with different types of line markings, sleeves with different luminescence properties, etc.), and barcode 626 could be used to assist the processing of the image that results from scanning checks positioned in the sleeve. For example, if one sleeve has particular line markings or particular luminescence properties, barcode 626 could indicate those properties so that the image processing techniques can be tuned for use with the particular sleeve being used. As another example, each customer of a financial institution can be provide with one or more sleeves that are customized for that customer, and barcode 626 may encode the customer's account number or other identifying information. Barcode 626 may also encode certain security techniques, such as digital signatures, to deter against counterfeit sleeves and/or counterfeit barcodes.

FIG. 7 shows another example sleeve 700. Sleeve 700 has areas 702, 704, 706 in which checks may be placed. The portion 708 of sleeve 700 that is outside of areas 702, 704, and 706 has an opaque or otherwise dark background. This dark background creates contrast with any checks that may be placed in areas 702, 704, and 706. If a flap (such as the flaps previously discussed) is used on the back of sleeve 700 to hold a check in place, the flap may be made of the same sort of opaque or dark material. A check, if present in an area of the sleeve, would cover the opaque or dark flap with material that is, by contrast, lighter in color, so the presence of a check can be detected based on where the light and dark areas appear in an image of the sleeve.

When a dark or opaque background is used, one way to detect the borders of a check is to convolve the image of the checks in the sleeve using a filter. The following is an example code fragment that can be used to perform the convolve operation, where the data array represents the filtering constants:

```
public static PlanarImage virtualEdgeEnhance(PlanarImage img)
{
  float data[ ]=
  {
  0.7f, 1f, −1.3f, 1f, 0.7f,
  0f, −1.3f, −2f, −1.3f, 0f,
  −1.3f, −2f, 35f, −2f, −1.3f,
  0f, −1.3f, −2f, −1.3f, 0f,
  0.7f, 1f, −1.3f, 1f, 0.7f
  };
  KernelJAI kernel=new KernelJAI(new Kernel(5, 5, data));
  //Create the convolve operation.
  PlanarImage temp=JAI.create("convolve", img, kernel);
  return temp;
}
```

When this filter is used, the check images will be mostly reduced to white data.

It is also possible to apply a threshold stage before the filter using an operation described by the following code fragment:

```
Histogram histogram=(Histogram) JAI.create("histogram", front).getProperty("histogram");
double[ ] front_low=histogram.getLowValue( );
double low[ ]={front_low[0]};
double high[ ]=Thistogram.getMinFuzzinessThreshold( )[0]};
double[ ] map_front={0};
front=threshold(front, low, high, map_front);
front=virtualEdgeEnhance(front);
public static BufferedImage threshold(BufferedImage src, double[ ] low, double[ ] high, double[ ] map){
  //http://java.sun.com/products/java-
  //media/jai/forDevelopers/jai1_0_1guide-unc/Analysis.doc.html#54907
    //Set up the operation parameters.
```

```
        //PlanarImage src, dst;
        //Integer [ ] low, high, map;
        //int bands=0;
        ParameterBlock pb=new ParameterBlock( );
        pb.addSource(src);
        pb.add(low);
        pb.add(high);
        pb.add(map);
        PlanarImage dst=JAI.create("threshold", pb, null);
        return dst.getAsBufferedImage( );
    }
```

When this threshold is applied before the convolve operation described previously, the edges of a check may appear more clear or well-defined than without the threshold operation, although edge detection can be performed with or without the threshold. Additionally, the convolve operation described previously can also be performed with the "data" variable set to contain the following filter constants in place of those previously shown:

```
    float data[ ]=
    {
    0.7f, 0.7f, −1.5f, 0.7f, 0.7f,
    0f, 40.0f, −20f, 40.0f, 0f,
    −1.3f, −20f, 20f, −20f, −1.3f,
    0f, 40.0f, −20f, 40.0f, 0f,
    0.7f, 0.7f, −1.5f, 2f, 0.7f
    };
```

The filtering values have been determined experimentally to give good contrast between a check and a background, when applied to a sleeve such as that shown in FIG. 7.

FIG. 8 shows an example sleeve 800 that can be used for checks that are sized differently from personal checks. Many types of checks, such as business checks, cashier's checks, teller's checks, etc., tend to be printed on different size paper than are normal personal checks, and these checks may not fit in the three-on-a-page portrait configuration shown in other figures and discussed previously. In the example of FIG. 8 areas 802 and 804 are arranged two on a page in landscape orientation to accommodate a larger check. A sleeve whose check areas are arranged in this manner may be combined with any of the techniques discussed above—e.g., flaps, corners, opaque or dark background, barcodes, line markings, etc. While check areas 802 and 804 may accommodate a check that is larger than a personal check, it should be noted that many business or bank checks are of different sizes from each other, and there may be issues as to the design of a check sleeve for checks whose size is unknown. For example, as previously discussed, the material of which a sheet is made may be cut out in the places expected for the MICR line and/or the numerical amount of a check. When the check's size is unknown, these areas may be made larger to accommodate various sized of checks, or other mechanisms may be used to hold a check in place such that the MICR line or the amount of the check is exposed through the designated area.

It should also be noted that, to the extent that an individual area of a check sleeve may or may not have a check placed in that area, a check sleeve can be configured that assists in determining whether a check has been placed within a particular area of the sleeve. For example, if the check sleeve is made of a transparent or semi-transparent material, then an area that is configured to hold a check but is empty would show a blank background when the sleeve is captured with a scanner. Such a blank background may appear as a form of noise with a high level of entropy—which would be relatively higher than an image that displays some amount of organization, such as that of a check. Thus, by comparing the entropy in a given area on an image of the sleeve with the expected level of entropy in a check image, the presence or absence of a check in a given area of the sleeve can be detected.

Figure 9:
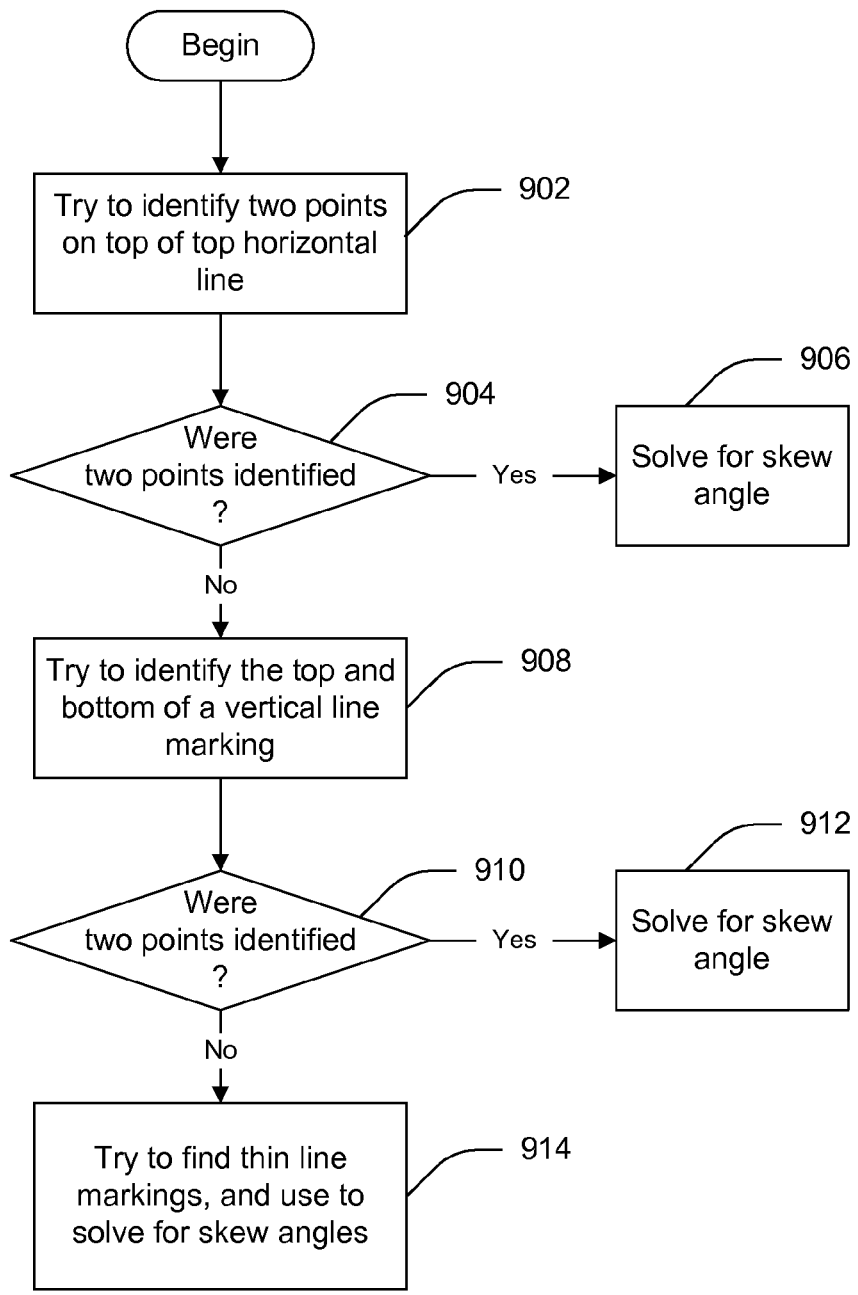
FIG. 9 is a flow diagram of an example process of orienting a check sleeve.

An image of a sleeve may be collected that is skewed at some angle, and the image of the sleeve may be oriented in order to properly interpret the images of the checks in the sleeve. As previously described in connection with FIG. 6, line markings may be printed on a sleeve which may be used to orient an image of a sleeve. FIG. 9 shows an example algorithm that uses markings shown in FIG. 6 to orient a sleeve.

At 902, an attempt is made to identify two points on the top of a thick horizontal line marking, such as marking 608 (shown in FIG. 6). One issue that arises in looking for these points is that any individual point, when taken in isolation, might be interpreted as noise. However, a point on the top of the line marking can be distinguished from random noise that happens to be the same color as the line marking by probing some number of pixels deep into the line (e.g., ten pixels) to determine if the expected color of the line marking continues to appear when probed ten pixels deep. Thus, if the image is examined from the top down and a point is encountered that appears to be the color of the line marking, then examination can continue downward. If the color continues to appear in the next several (e.g., ten) pixels examined, then it can be assumed that the initially discovered point was a point on the top of the horizontal line marking.

If two points on the top of the horizontal line marking were found (as determined at 904), then these two points define a skew angle that can be solved for. In this case, the two points are used to solve for the skew angle (at 906), which provides the orientation of the page.

If two points on the top of the horizontal line marking could not be identified, then the process continues to 908. At 908, an attempt is made to identify the tops and bottoms of the vertical line markings (e.g., line markings 612 and 613, shown in FIG. 6). If the top and bottom of one of the lines is found, then the positions of the top and bottom define a skew angle. Moreover, since the relative positions and lengths of line markings 612 and 613 is known, finding any two points (e.g., the top of one line and the bottom of another) would define an angle that could be solved for. Of the four points being searched for (the top and bottom of each of two lines), if any two of these points can be identified (as determined at 910), then the skew angle is solved for at 912.

If two points are not identified, then the thin horizontal line markings (e.g., markings 614, 616, and 618, shown in FIG. 6) are found (at 914). Points on these lines can be found, and using the found points, the relationship of the points to each other, and the known positions of the line markings, an angle can be solved for.

Figure 10:
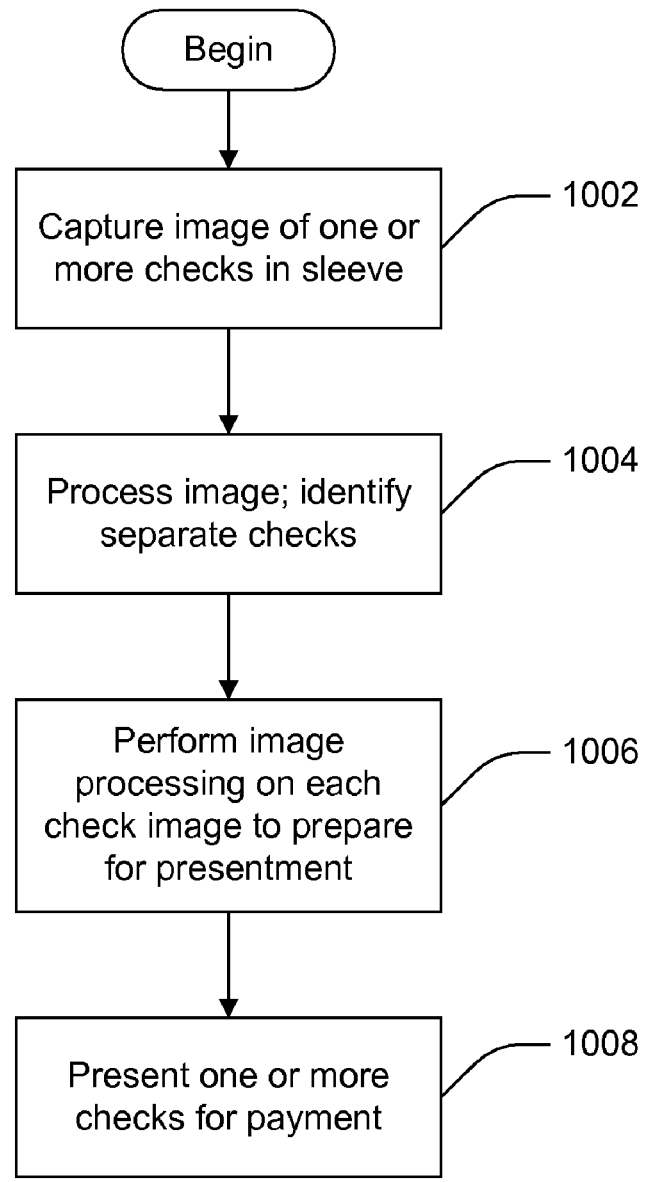
FIG. 10 is a flow diagram of an example process of capturing and presenting a check image for payment.

A reason to capture check images using the check sleeves described herein is to present images of the checks for payment. Developments in law and technology (e.g., the Check-21 law) make it possible to present an image of a check for payment in place of a physical paper check. FIG. 10 shows an example process of capturing and presenting an image of a check for payment.

At 1002, images are captured of the front and back of one or more checks in a sleeve. At 1004, the captured images are processed to identify which portion(s) of the images represent the check. The process of determining which portions of the check represent the image may include sub-processes, such as the orientation process previously described in connection with FIG. 11, or a process of finding an edge of a check image based on convolution and filtering.

At 1006, the individual check images may be processed in order to prepare them for electronic presentment. For example, any wrappers, headers, or markings, to be applied to an image, or any re-sizing or format adjustment that may be expected for presentment of a check image, can be performed at this time.

At 1008, the check images are presented for payment through a banking system—e.g., through a branch of the Federal Reserve Bank, or a commercial clearinghouse.

Figure 11:
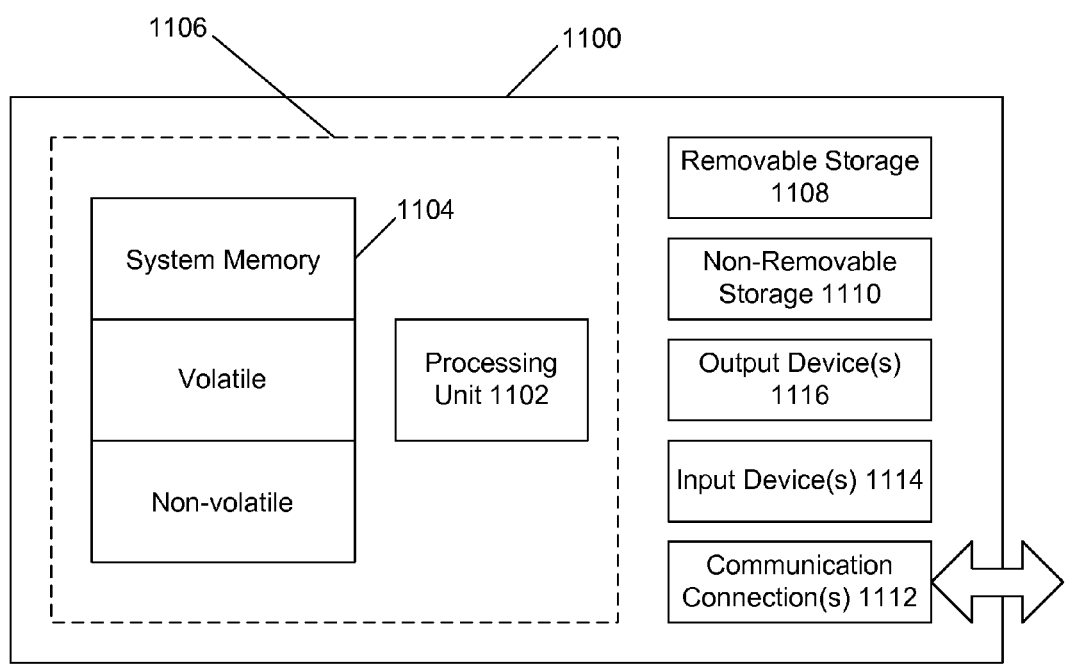
FIG. 11 is a block diagram of an example computing environment in which example embodiments and aspects may be implemented

The subject matter described herein may be implemented through the use of a computer system, or other type of device that has some computing mechanism(s). FIG. 11 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an example system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by computing device 1100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 1104, removable storage 1108, and non-removable storage 1110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1100. Any such computer storage media may be part of computing device 1100.

Computing device 1100 may also contain communications connection(s) 1112 that allow the device to communicate with other devices. Communications connection(s) 1112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 1100 may also have input device(s) 1114 such as keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

The invention claimed is:

1. A system for obtaining one or more images of a plurality of checks, the system comprising:
   a memory;
   a processor coupled with said memory and configured to execute a plurality of instructions stored in said memory to:
      receive an image of a first side of a sleeve that holds the plurality of checks, said image comprising a first portion that contains the plurality of checks, and a second portion that does not contain the plurality of checks, the sleeve including at least one marking printed on said second portion;
      perform an image processing operation to distinguish said first portion from said second portion;
      orient said image based on a detected orientation of the at least one marking; and
      present electronically, with said oriented image, said one or more checks to be paid through a banking system.

2. The system of claim 1, wherein said at least one marking comprises a horizontal line, and to orient said image, said processor further to execute instructions to:
   identify a first point on said horizontal line;
   identify a second point on said horizontal line; and
   solve for a skew angle of said image based on said first point and said second point.

3. The system of claim 1, wherein said at least one marking comprises a vertical line, and to orient said image, said processor further to execute instructions to:
   identify a top of said vertical line;
   identify a bottom of said vertical line; and
   solve for a skew angle of said image based on said top and said bottom.

4. The system of claim 1, wherein said at least one marking comprises a first vertical line and a second vertical line, said first vertical line having a first predetermined length, said second vertical line having a second predetermined length, said first vertical line and said second vertical line having a predetermined distance between them, and wherein to orient said image, said processor further to execute instructions to:
   identify a first point that is either a top or a bottom of either said first vertical line or said second vertical line;
   identify a second point that is either a top or a bottom of either said first vertical line or said second vertical line, said second point being different from said first point; and
   solve for a skew angle of said image based on said first point, said second point, said first predetermined length, said second predetermined length, and said predetermined distance.

5. The system of claim 1, wherein said at least one marking comprises a plurality of horizontal lines, and to orient said image, said processor further to execute instructions to:
   identify at least two points among said plurality of horizontal lines; and
   solve for a skew angle based on said at least two points and on dimensions and positions of said plurality of horizontal lines.

6. The system of claim 1, wherein said second portion comprises a background, and said processor further to execute instructions to:
   apply a filter to increase contrast in said image between said first portion and said second portion; and
   identify an edge of said first portion based on the image with an increased contrast.

7. The system of claim 1, wherein said processor further to execute instructions to:
   calculate an entropy of said first portion to determine whether a check is present in said first portion.

8. A method of obtaining one or more images of a plurality of checks, the method executable by a computing device including a processor and memory, the memory storing instructions executable by the processor, the method comprising:
   receiving an image of a first side of a sleeve that holds the plurality of checks, said image comprising a first portion that contains the plurality of checks, and a second portion that does not contain the plurality of checks, the sleeve including at least one marking printed on said second portion;
   performing, by said processor, an image processing operation to distinguish said first portion from said second portion;
   orienting, by said processor, said image based on a detected orientation of the at least one marking; and
   electronically presenting, with said computing device and using said oriented image, said one or more checks to be paid through a banking system.

9. The method of claim 8, wherein said at least one marking comprises a horizontal line, and wherein said orienting comprises:
   identifying a first point on said horizontal line;
   identifying a second point on said horizontal line; and
   solving for a skew angle of said image based on said first point and said second point.

10. The method of claim 8, wherein said at least one marking comprises a vertical line, and wherein said orienting comprises:
    identifying a top of said vertical line;
    identifying a bottom of said vertical line; and
    solving for a skew angle of said image based on said top and said bottom.

11. The method of claim 8, wherein said at least one marking comprises a first vertical line and a second vertical line, said first vertical line having a first predetermined length, said second vertical line having a second predetermined length, said first vertical line and said second vertical line having a predetermined distance between them, and wherein said orienting comprises:
    identifying a first point that is either a top or a bottom of either said first vertical line or said second vertical line;
    identifying a second point that is either a top or a bottom of either said first vertical line or said second vertical line, said second point being different from said first point; and
    solving for a skew angle of said image based on said first point, said second point, said first predetermined length, said second predetermined length, and said predetermined distance.

12. The method of claim 8, wherein said at least one marking comprises a plurality of horizontal lines, and wherein said orienting comprises:
    identifying at least two points among said plurality of horizontal lines; and solving for a skew angle based on said at least two points and on dimensions and positions of said plurality of horizontal lines.

13. The method of claim 8, wherein said second portion comprises a background, and wherein performing said image processing operation comprises:
applying a filter to increase contrast in said image between said first portion and said second portion; and
identifying an edge of said first portion based on the image with an increased contrast.

14. The method of claim 8, further comprising:
calculating an entropy of said first portion to determine whether a check is present in said first portion.

15. A non-transitory computer-readable medium comprising computer-readable instructions executable by a processor for obtaining one or more images of a plurality of checks, the computer-readable instructions comprising instructions that:
receive an image of a first side of a sleeve that holds the plurality of checks, said image comprising a first portion that contains the plurality of checks, and a second portion that does not contain the plurality of checks, said sleeve including at least one marking printed on said second side;
perform an image processing operation to distinguish said first portion from said second portion;
orient said image based on a detected orientation of the at least one marking; and
present electronically, with said oriented image, said one or more checks to be paid through a banking system.

16. The computer-readable medium of claim 15, wherein said at least one marking comprises a horizontal line, and wherein said instructions to orient further comprise instructions that:
identify a first point on said horizontal line;
identify a second point on said horizontal line; and
solve for a skew angle of said image based on said first point and said second point.

17. The computer-readable medium of claim 15, wherein said at least one marking comprises a vertical line, and wherein said instructions to orient further comprise instructions that:
identify a top of said vertical line;
identify a bottom of said vertical line; and
solve for a skew angle of said image based on said top and said bottom.

18. The computer-readable medium of claim 15, wherein said at least one marking comprises a first vertical line and a second vertical line, said first vertical line having a first predetermined length, said second vertical line having a second predetermined length, said first vertical line and said second vertical line having a predetermined distance between them, and wherein said instructions to orient further comprise instructions that:
identify a first point that is either a top or a bottom of either said first vertical line or said second vertical line;
identify a second point that is either a top or a bottom of either said first vertical line or said second vertical line, said second point being different from said first point; and
solve for a skew angle of said image based on said first point, said second point, said first predetermined length, said second predetermined length, and said predetermined distance.

19. The computer-readable medium of claim 15, wherein said at least one marking comprises a plurality of horizontal lines, and wherein said instructions that orient further comprise instructions that:
identify at least two points among said plurality of horizontal lines; and
solve for a skew angle based on said at least two points and on dimensions and positions of said plurality of horizontal lines.

20. The computer-readable medium of claim 15, wherein said second portion comprises a background, and wherein said instructions that perform said image processing operation further comprise instructions that:
apply a filter to increase contrast in said image between said first portion and said second portion; and
identify an edge of said first portion based on the image with an increased contrast.

21. The computer-readable medium of claim 15, further comprising instructions that:
calculate an entropy of said first portion to determine whether a check is present in said first portion.

* * * * *